United States Patent [19]

Choate

[11] Patent Number: 4,685,143
[45] Date of Patent: Aug. 4, 1987

[54] METHOD AND APPARATUS FOR DETECTING EDGE SPECTRAL FEATURES

[75] Inventor: William C. Choate, Dallas, Tex.

[73] Assignee: Texas Instruments Incorporated, Dallas, Tex.

[21] Appl. No.: 714,659

[22] Filed: Mar. 21, 1985

[51] Int. Cl.⁴ .......................... G06K 9/52; G06K 9/62
[52] U.S. Cl. ........................................ 382/25; 382/22; 382/21; 382/18
[58] Field of Search ....................... 382/22, 21, 18, 25; 343/5 SA, 5 CM, 5 MM; 356/376

[56] References Cited

U.S. PATENT DOCUMENTS

| | | | |
|---|---|---|---|
| 4,156,230 | 5/1979 | Riganati et al. | 382/21 |
| 4,319,243 | 3/1982 | Vachenauer | 342/37 |
| 4,545,067 | 10/1985 | Juvin et al. | 382/21 |
| 4,567,610 | 1/1986 | McConnell | 382/18 |
| 4,653,107 | 3/1987 | Shojima | 382/22 |

Primary Examiner—David K. Moore
Assistant Examiner—A. Anne Skinner
Attorney, Agent, or Firm—Kenneth C. Hill; James T. Comfort; Melvin Sharp

[57] ABSTRACT

Edge maps (40) derived from images are used to compute edge spectra (44), an edge spectrum having a plurality of components (41, 43) corresponding to the angular bins (60) of edge vectors having equal angular widths. Various feature detectors (56) process the edge spectrum to yield information identifying the image. A linear detector correlates a shifted prototype edge spectrum (45) to an input spectrum (44). Nonlinear detectors analyze edge spectra to detect mutually orthogonal edges and edge reversal features (90). Higher level logic (30) is used to select certain detected edge reversal features (90) as the ends of an object (16) depicted in the image.

24 Claims, 18 Drawing Figures

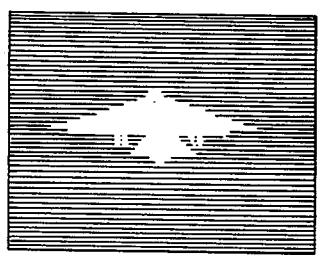
FIG. 4
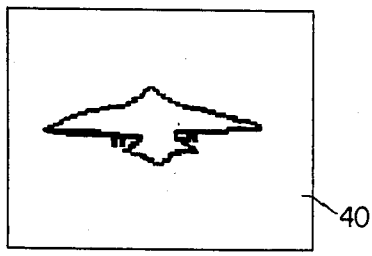
FIG. 5
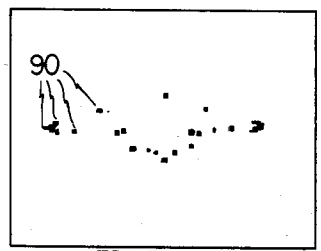
FIG. 6
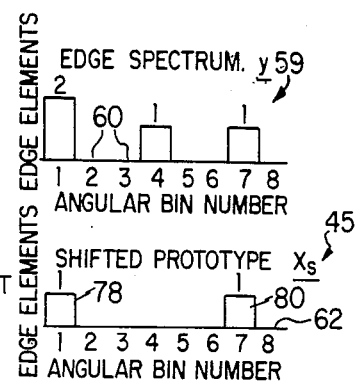
FIG. 7a
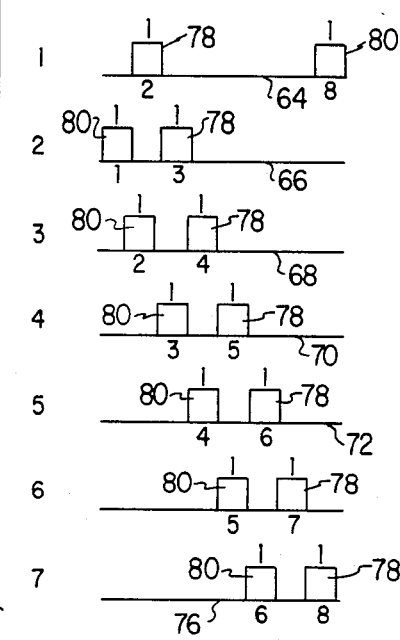
FIG. 7b
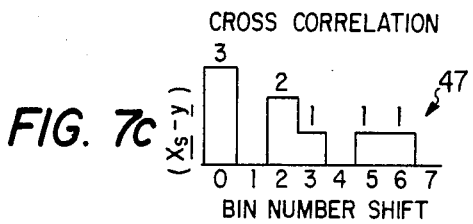
FIG. 7c
FIG. 9
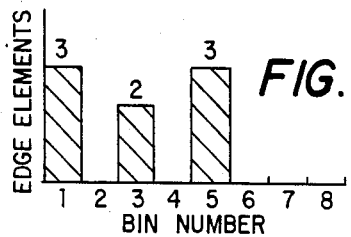
FIG. 8
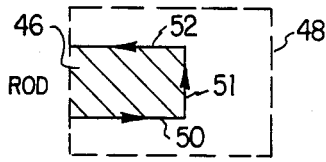
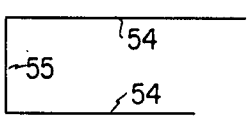 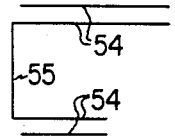
FIG. 12a  FIG. 12b

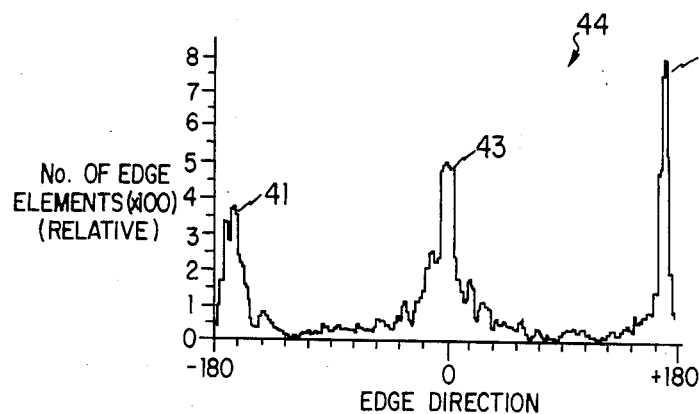
FIG. 10
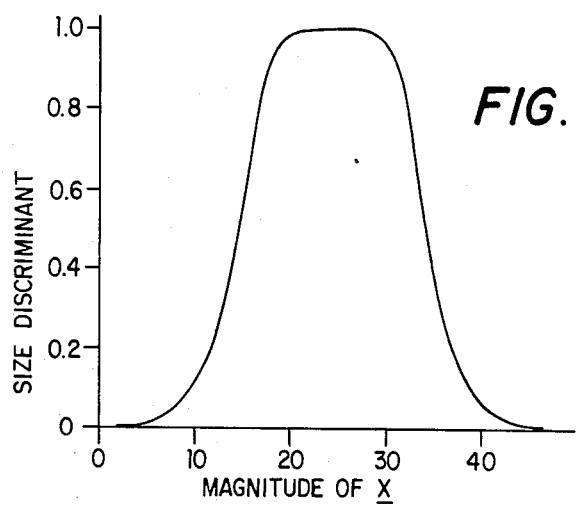
FIG. 11
FIG. 13
← 180 DEGREES ----- LENGTH = 20
0 DEGREES → ----- LENGTH = 14
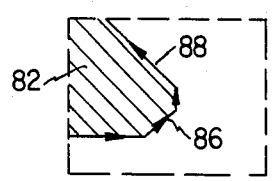
FIG. 14
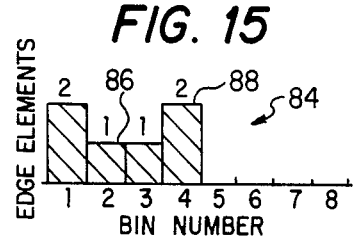
FIG. 15

METHOD AND APPARATUS FOR DETECTING EDGE SPECTRAL FEATURES

TECHNICAL FIELD OF THE INVENTION

This invention relates generally to the field of image processing, and more particularly relates to recognition of images by the construction and analysis of edge maps.

BACKGROUND OF THE INVENTION

The construction of edge maps has heretofore been popular in automatic image processing and recognition for several reasons. Most important is the ability of edges to convey significant scene information in condensed form. This is evident by the ability of humans to interpret the edge maps of most scenes almost as readily as the line drawings they resemble.

Another advantage of edge maps is that edge lines can be mapped into other lines under affine transformations which model the effects of perspective. Therefore, edge structure is preserved from map to map when an object is seen from somewhat different aspects.

One class of methods for extracting an edge map from an image is discussed in Werner Frei and Chung-Chin-Chen, "Fast Boundary Detection; A Generalization And A New Algorithm", *IEEE Transactions on Computers,* Vol. C-26, Number 10, October, 1977.

Scene matching based on edge maps have superseded techniques based on cross correlation. Generally, a cross correlation technique compares a feature in a conventional intensity modulated image to a prototype in order to accept or reject the image as similar to the prototype. The advantages of an edge-based approach in cross correlation techniques are described in the following papers: S. Dudani & Carol Clark, "Vertex-Based Model Matching", *Proceedings of the Symposium on Current Mathematical Problems in Image science,* Monterey, Calif., Nov. 10-12, 1976; S. Dudani, J. Jenney, and B. Bullock, "Correlation and Alternatives for Scene Matching: *Proceedings of the 1976 IEEE Conference on Decision and Control,* Clearwater, Fla., Dec. 1-3, 1976; and S. Dudani & Anthony L. Luk, "Locating Straight-Line Edge Segments on Outdoor Scenes", *Proceedings of the 1977 IEEE Computer Society Conference on Pattern Recognition and Image Processing,* Troy, N.Y., June 6-8, 1977.

One main disadvantage of such autocorrelation techniques is the requirement of storage of large amounts of information for each prototype against which the image is to be compared. This in turn requires large system overhead and is a relatively slow comparison process.

The present invention solves these problems by computing an edge spectrum from the edge map. The edge spectrum contains useful information in a form even more condensed than the edge map from which it is derived. The information may be processed by any of several feature detectors to determine whether, for instance, the edge map contains mutually orthogonal edges or other structural details useful in identifying the image.

The present technique of image recognition is faster than conventional methods by several orders of magnitude. Because it uses edge direction and not edge magnitude (the darkness or prominence of an edge) it is immune to changes in scene illumination and contrast. The method is amenable to pipe-lining for real time implementation, and storage problems do not normally arise because the edge spectrum is used immediately upon its computation.

SUMMARY OF THE INVENTION

According to the invention a source image is digitized and then first processed into an edge map by an operator such as a Sobel operator. The edge map is an array of edge elements, each representable by a vector having magnitude and a direction.

Edge element magnitude is related to how sharp or prominent the edge is in the image. Direction can be defined as the angle of the vector aligned with the edge and directed so that image pixels on the immediate right are coded with smaller values.

Once an edge map has been generated, the invention accumulates for each of several points in the map, an edge spectrum for a neighborhood of the edge map surrounding the point.

The spectrum consists of n components $x_i$, $i=1, 2, \ldots n$, with component $x_i$ giving the number of edge elements in the neighborhood having a quantized direction i. The magnitude of any edge spectrum component $x_i$ may range from 0 to M, where M is the number of points in the neighborhood.

Once an edge spectrum for a particular point in the edge map has been accumulated, it can next be subjected to analysis by any of a number of feature detectors. In general, feature detectors use mathematical manipulations of edge spectral data to yield useful information. They are based on the fact that a distinctive pattern in the edge spectrum results from the mapping of attributes of physical objects in the real world.

Linear detectors employ crosscorrelation of the input edge spectrum with a stored prototype, representing the pattern to be detected. This class of detectors is equivalent to the linear discriminant functions discussed in Chapter 5 of *Pattern Classification and Scene Analysis,* Duda and Hart, Wiley—Interscience Publication, 1973. The term linear applies because the correlation product satisfies the law of superposition. Nonlinear detectors do not satisfy this law.

Within any spectrum, there may be several pairs of components which are mutually orthogonal, and these pairs are processed to yield an orthogonal feature magnitude which is useful in determining whether a corner or other orthogonal feature exists within the corresponding neighborhood of the image.

Another nonlinear feature detector detects edge reversals in the image. It may be used to find the ends of a relatively oblong object, such as the wing tips of a landing aircraft.

The structural reversal detector is provided to look for a gap of several components within an edge spectrum; this lack of edge elements in any of an adjacent plurality of directions implies that what is pictured within the neighborhood is an end of the imaged object.

Once such a gap is detected, the direction of an edge reversal feature may be calculated by averaging the angle of the missing spectral components and subtracting 90° from the average.

Where an edge reversal feature is found, the edge reversal feature detector calculates an edge reversal feature magnitude as a function of a symmetry discriminant and a size discriminant. The size discriminant compares the number of edge elements, or total magnitude of the input spectrum to the total number of pixels in the neighborhood. The discriminant reaches a maximum value when the total magnitude equals a predetermined fraction of the number of pixels in the neighborhood. The symmetry discriminant is calculated from the magnitude of the components bounding the gap in the spectrum.

In order to reduce the number of spurious edge reversal features and to make the entire process faster, a preliminary binary indicator may be employed before feature magnitude calculation, to return a binary return bit and also the direction of the edge reversal feature. The binary indicator table has a series of addresses, each represented by an n bit binary number, n being the number of angular bins of the edge spectrum. Each address is a code for a corresponding type of edge spectrum. The input spectrum is quantized into an address of n bits, matched with one of the entries of the binary indicator table, and the return bit and edge reversal direction retrieved. The binary indicator table is set up in advance so that if the input spectrum does not meet certain criteria, a return bit of zero is returned, indicating that the edge reversal feature magnitude is zero. If the spectrum does meet these criteria, a return bit of one is returned and the magnitude is calculated per above.

Once several edge reversal features are detected in respective neighborhoods of the edge map, a higher level logic unit may be used to select which of a pair of edge reversals represent ends of the object depicted in the image. First, the edge features are localized by purging submaximal points within particular areas of the edge map, leaving a handful of maximal points that are better localized. These remaining handful of maximal points are then tested to see if they exist in pairs, i.e., one feature is tested against any of a number of other features to determine if there is a paired feature having an opposite direction.

From this purging and pairing process, a very small number of paired edge reversal features result, which can be further sorted by calculating the distance between a pair and comparing the distance to predetermined ranges to select which pair represents the ends of the object. In this manner, the type of the object can be identified where the dimension between the detected ends is an important discriminant between object types.

BRIEF DESCRIPTION OF THE DRAWINGS

For a more complete description of the present invention and objects and advantages thereof, reference is now made to the following description taken in conjunction with the following Drawings, in which:

FIG. 4 is a forward-looking infrared (FLIR) image of a landing A7 naval aircraft as seen from a carrier deck;

FIG. 5 is an edge map of the image shown in FIG. 4 as it would appear on a CRT;

FIG. 6 is a diagram of a partial edge map of an A7 aircraft, showing edge reversal features as identified by an edge reversal feature detector of the invention;

FIGS. 7a–7c schematically show the process of correlating an edge spectrum with a stored prototype in a linear detector function of the invention;

FIG. 8 is a view of a target structure inside an accumulation neighborhood, showing edges;

FIG. 9 is an edge spectrum for FIG. 6;

FIG. 10 is an edge spectrum corresponding to the edge map of FIG. 5;

FIG. 11 is a graph of an exemplary size discriminant function used in the edge reversal feature detector of the invention;

FIGS. 12a and 12b are exemplary edge maps to show operation of a symmetry discriminant function used in the invention;

FIG. 13 is a schematic diagram showing the right-going and left-going edge components of FIG. 12a;

FIG. 14 is a view similar to FIG. 8 of another target structure; and

FIG. 15 is an edge spectrum associated with FIG. 14.

DETAILED DESCRIPTION OF ILLUSTRATED EMBODIMENTS

Figure 1:
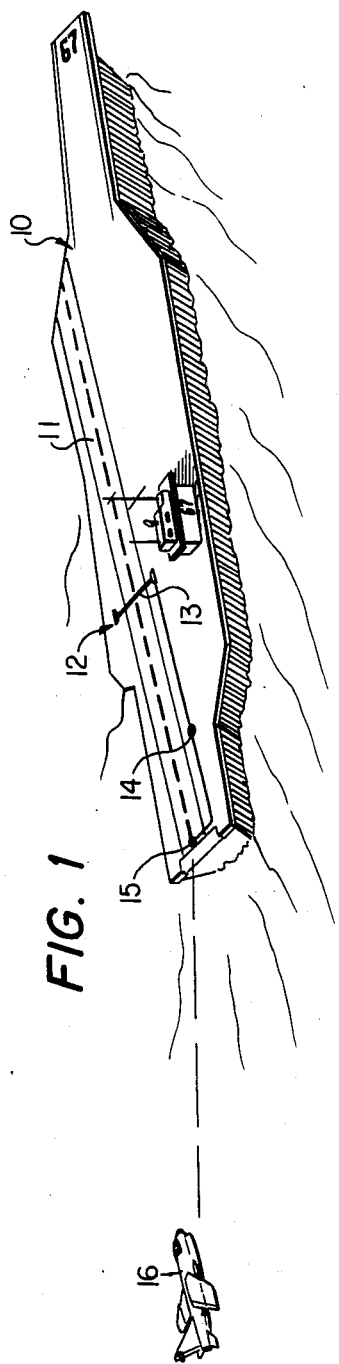
FIG. 1 is a perspective view showing employment of the invention in a naval aircraft recognition and landing system.

Attention is now directed toward FIG. 1 which illustrates an application of the invention. An aircraft carrier 10 includes a carrier runway 11. A landing aircraft cable arrest system is diagramatically illustrated at location 12. Cable arrest system 12 is adjusted to receive one of several types of landing aircraft, such as an A7, an A6, an E2C or an F14, particularly by adjusting the tension of a deck cable 13. Mounted at a strategic point on the aircraft carrier runway 11 is a forward-looking infrared (FLIR) scope and laser range detector 15. FLIR 15 produces an infrared image of an aircraft 16, an example of which is shown in FIG. 4. An edge spectral feature detection system 14 is placed at a convenient location on aircraft carrier 10 as connected between scope and detector 15 and cable arrest system 12 and is monitored by an aircraft landing officer. Detection system 14 identifies which type of aircraft is approaching and adjusts arrest system 12 in accordance therewith.

Figure 2:
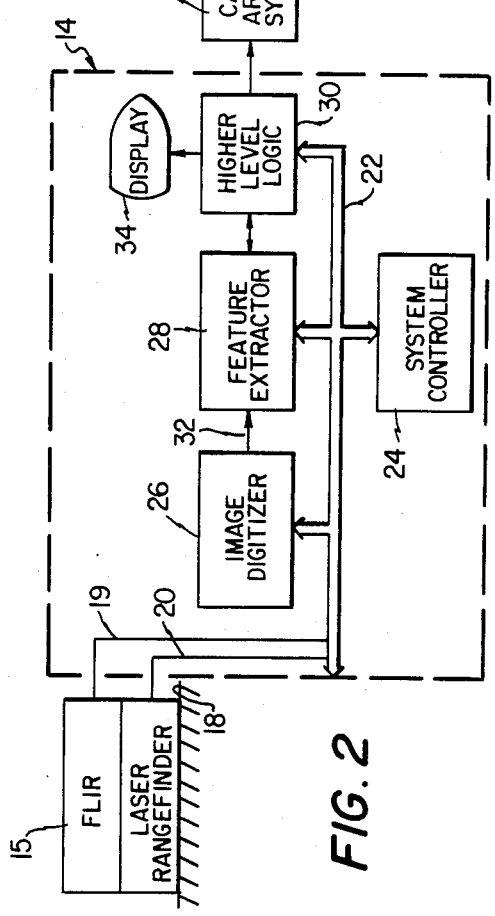
FIG. 2 is a schematic block diagram of the system shown in FIG. 1.

In FIG. 2, FLIR scope and range detector 15 is mounted to a stabilizing platform 18 by separate gimbals (not shown). The FLIR scope and detector 15 is linked through communications links 19, 20 to the present detection system 14, which includes a bus 22, a system controller 24, an image digitizer 26, a feature extractor 28 and a higher level logic unit 30. Image digitizer 26 takes the raw FLIR image, digitizes it, and processes it into an edge spectrum, which is sent via line 32 to feature extractor 28 for analysis. Feature extractor 28 identifies certain structural features present in the edge map corresponding to the image, which are used by higher level logic unit 30 to identify the image as a particular aircraft. Higher level logic unit 30 then signals cable arrest system 12 as to what type of aircraft is landing. Arrest system 12 will then adjust the tension of cable 13 to properly arrest the forward progress of aircraft 16. Optionally, a display 34 may also be employed to show identification results and/or intermediate steps.

Figure 3:
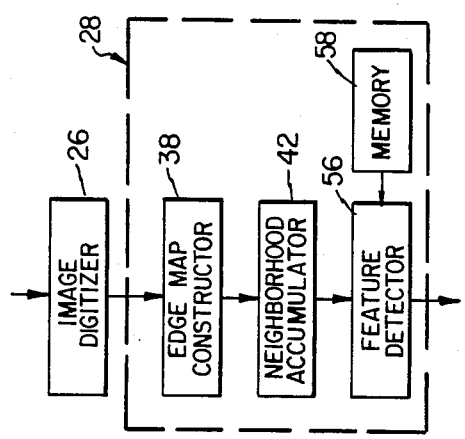
FIG. 3 is a schematic block diagram of the feature extractor of the system.

Image digitizer 26 is shown in more detail in FIG. 3, wherein the source image of an aircraft such as an A7 aircraft from FLIR scope and detector 15 is digitized into an array of integers by digitizer 26, the integers Varying as a function of image intensity at that point. This image is processed by an edge map constructor 38 which uses an operator, such as the Sobel operator.

The Sobel operator computes the dot product between each 3×3 sub-area B of the image matrix and the Sobel Weighting Functions $W_1$, $W_2$ to obtain Sobel product determinants R and S. 3×3 Weighting Functions are given by:

$$W_1 = \begin{bmatrix} 1 & 2 & 1 \\ 0 & 0 & 0 \\ -1 & -2 & -1 \end{bmatrix}$$

and $$W_2 = \begin{bmatrix} 1 & 0 & -1 \\ 2 & 0 & -2 \\ 1 & 0 & -1 \end{bmatrix}$$

The edge magnitude $\rho$ at the center of B is:

$$\rho = (R^2 + S^2)^{\frac{1}{2}}$$

For most applications it suffices to approximate
$\rho \simeq$ maximum $(|R|, |S|)$ where $|\ldots|$ denotes absolute Value. Where $\rho$ is above a certain threshold value, an edge element is determined to exist at the center of B. The orientation of the edge element is given by:

$$\theta = \arctan(S/R).$$

When the Sobel operator, or the improved operator described by Frei and Chen in "Fast Boundary Detection: A Generalization and a New Algorithm", *IEEE Transactions on Computers*, Volume C-26, No. 10, October, 1977, is used successively over each subarea of the image, an edge map 40 (to be further described in FIG. 5) corresponding to the image is obtained.

FIG. 4 shows a FLIR image of an A-7 aircraft, and FIG. 5 shows a black-and-white rendition of a corresponding edge map as it would appear on display 34. For each edge element, display 34 can show its location, its magnitude (i.e., edge sharpness or intensity) and its direction. Edge magnitude is shown by intensity; edge direction is shown by color. FIG. 5 can only show the first two of these three pieces of information.

A FORTRAN source code listing is attached hereto as Appendix A. The first part of the source code listing shows the generation of an edge map from a digitized source image by use of the Sobel operator. For faster operation, Sobel operators $W_1, W_2$ have been replaced by equivalent recursive operations:

$$w_1 = \begin{bmatrix} 1 \\ 1 \end{bmatrix} \quad w_2 = \begin{bmatrix} 1 \\ -1 \end{bmatrix} \quad w_1^T = [1 \; 1] \quad w_2^T = [1 \; -1]$$

The image is first convolved with $w_1^T$ and $w_1$ to obtain an intermediate image C. C is convolved with $w_2^T$ and $w_1$ to get R, and is convolved with $w_1^T$ and $w_2$ to get S. Instead of exactly finding $\theta$, the program compares Sobel product determinants R and S to determine the octant of the edge element. In the embodiment exemplified by the source listing there are but eight angular bins into which $\theta$ is quantized; this is sufficient specification.

Edge map 40 is an array of edge elements, each representable by a magnitude and a direction. A magnitude of zero implies that there is no edge at that location in the source image. Direction is defined in this embodiment as the angle of the vector aligned with the edge and directed so that image pixels on the immediate right are coded with smaller values. It is undefined if magnitude is zero.

Once an edge map of an object is obtained, a neighborhood accumulator 42 (FIG. 3) next accumulates an edge spectrum from it for one or more neighborhoods of image pixels. The edge spectrum at a point inside a selected neighborhood is computed by accumulating edge directions over the neighborhood, which is preferably centered at the point. The neighborhood is chosen to be of odd dimension so the center coincides with a pixel location. Since there are n directions where n is a number of angular bins, the spectrum can be represented as an n-vector x, where $x_i$ gives the number of elements with direction i. The range of $x_i$ is 0 to M, where M is the number of points in the neighborhood. In a preferred embodiment, neighborhood accumulator 42 operates on rectangular neighborhoods by use of a fast, recursive accumulation algorithm; elements are first horizontally accumulated by row and then vertically accumulated by column.

To suppress the influence of non-edges on the edge spectrum, edge elements with small magnitudes are rejected rather than accumulated. The threshold between rejected and non-rejected elements is determined such that the percentage of rejected edges is constant throughout the image. As a result, the edge spectrum is insensitive to changes of scene contrast that are uniform across the image.

The latter portion of the FORTRAN listing attached as Appendix A suppresses weak edge elements and then accumulates an edge spectrum for an edge map neighborhood.

Thresholding can be avoided by accumulating edge magnitude for each quantized edge direction. This may be normalized by dividing by the average edge magnitude throughout the edge map. If the operator disclosed by Frei and Chen is substituted for the Sobel operator in edge map constructor 38, a global normalization step could be omitted, as their edge operator has the advantage of being self-normalizing with respect to local image contrast.

FIG. 10 shows an edge spectrum 44 for a neighborhood centered on a single point of the edge map shown in FIG. 5. The y-axis shows the number of edge elements accumulated for any specific edge direction. The x-axis plots the quantized angular direction of the edge element, in this case extending from $-180°$ to $+180°$ with very fine angular resolution. As will later be shown, each particular location along the edge directional axis can be quantized into a specific binary address.

Edge spectrum 44 is periodic, with a period of $2\pi$ radians or $360°$. Therefore, the left and right ends of the plot shown in FIG. 6 are adjacent. This periodicity assures that cross correlation with a prototype edge spectrum will always be defined, i.e., the prototype will not fall off the ends of the input edge spectrum.

Edge spectrum 44 can be used to determine the roll of an aircraft seen in frontal aspect. Leading and trailing edges of the wings show up as peaks 41, 43. With no roll, peaks 41, 43 are symmetrical around zero. Roll causes an offset which can be measured. The illustrated application employs a fine angular resolution and a large, eccentric accumulation neighborhood, parameters which are different from those used later in describing some exemplary feature detectors of the invention. FIG. 10 clearly illustrates the underlying principle of edge feature detection: a distinctive pattern in the edge spectrum with respect to edge direction results from the mapping of attributes of physical objects in the real world.

Edge spectra in general have the following advantageous characteristics:

1. Edges carry key scene information in condensed form. This is evidenced by the ability of humans to readily interpret the edge maps of most scenes. Manmade or man-cultivated objects are especially rich in lineal detail, which makes them well suited to edge representation.

2. Lines are preserved under affine transformations which model the effects of perspective on the image. The model is accurate in most applications, particularly at long stand-off ranges and narrow fields of view. Since lines are preserved, it is only necessary to compute the effects of the transformation on the end points. The ability to deal with perspective is important in scene matching for autonomous navigation and in recognition of fixed targets.

3. Edge spectra are insensitive to changes of scene illumination and contrast. This is especially valuable with FLIR images, where contrast changes with daylight conditions and the history of target activity. This is because edge direction is contrast-independent and edge magnitude has only a second order effect.

4. Edge spectra suppress random noise. Random noise is first rejected by thresholding unless it imparts an edge-like character to the 3×3 domain of the Sobel or alternative operator. Second, randomly distributed pseudo-edges are suppressed by the averaging effects of the neighborhood accumulation. Fixed pattern noise, such as the "corduroy noise" seen in some FLIR imagery, is not as well suppressed, but may be reduced by preprocessing, although elimination at scope and range finder 15 is preferred.

5. Due to overlap of the neighborhoods, the spectrum varies smoothly from point to point. Therefore, structural features can be detected with relatively coarse sampling. Once detected, the structural features can be localized by a directed search, such as the one hereinafter described.

6. An edge spectrum of an image can be determined by only 24N integer operations, where N is the number of pixels in the image. Of these integer operations, multiplication is the slowest; it occurs 2N times. Determination of the edge map and edge spectrum is amenable to pipelining for real-time implementation, and storage is normally not an issue because the edge spectrum is used immediately upon computation.

The efficiency of the invention can be illustrated by example. In one application an edge feature detecting mutually orthogonal edges, called the Edge Activity, was developed to evaluate regions of an image for suitability for conventional correlation tracking. The correlation template had a dimension of 17×17 pixels and the tracker performed the correlation in a 33×33 search area. Using autocorrelation to perform the evaluation required 146,874N operations where N is the number of pixels processed (N=262,144). These operations are about evenly divided between addition and slower multiplication operations. Evaluation of a feature by use of its edge spectrum is thus faster for this example by a factor of about 6,000.

Once a spectrum has been accumulated for a particular neighborhood, a feature detector 56, which may be any of several types, may analyze the spectrum for the occurrence of structural features in the original image. Generally, such feature detectors are classified as linear or nonlinear.

Linear detectors determine feature magnitude and direction by correlating the input edge spectrum with a stored prototype, shown stored in a memory unit 58 (FIG. 3). Feature magnitude is the maximum correlation product obtained by this procedure. Feature direction is the offset, or lag, at which the maximum occurs. The term "linear" applies because the correlation product satisfies the law of superposition. That is, the correlation product for a composite input A+B is the sum of the correlation products for A and B individually. While superposition is in general violated in the final step of determining the maximum correlation product and its lag, it is common in pattern classification theory (See Chapter 5 of Duda and Hart, *Pattern Classification and Scene Analysis*, Wiley—Interscience Publication, 1973) to refer to this class of detector as linear. Nonlinear detectors are those for which the law of superposition does not apply at any stage of processing.

In some instances, it may be desirable to "correct" the magnitude computed in this manner with a bias. Let x denote the prototype after a circular shift and y, the input spectrum. The correlation product is given by the vector inner product $<x, y>$. Note that this function, if left uncorrected, is proportional to the magnitude of y. In some instances, the feature magnitude is preferred to peak when x and y are most similar or when the dissimilarity metric $J=0.5 \ ||x-y||^2$ is at a minimum. The norm in the above equation is Euclidian. Expanding the dissimilarity metric, we obtain:

$$J=0.5 \ ||x||^2 - <x,y> + 0.5 \ ||y||^2$$

Therefore, a corrected feature magnitude will be obtained if $0.5 \ (\ ||x||^2 + \ ||y\mu^2)$ is subtracted from the correlation function $<x,y>$. This is preferably done after the peak value of the function has been determined.

FIGS. 7a–7c illustrate the linear correlation process. In this example, edge spectrum 59 is divided into eight angular bins 60 each corresponding to an octant or 45° range of edge element directions. Edge spectrum 59 is correlated to a prototype 45 at successive angular bin shifts 62–76 along the edge direction axis. As unshifted, prototype spectrum 45 has a nonzero component 78 at bin 1 and another nonzero component 80 at bin 7. For each successive shift, the bin number of each component is incremented by 1, with bin 9 being equal to bin 1 because of the circular nature of the function. Thus, with a shift of 2 bin numbers at 66, component 80 is shifted to bin 1 and component 78 is shifted to bin 3. Shifting prototype spectrum 45 in this way is analogous to rotating a prototype image to achieve a best fit to an input image.

FIG. 7c shows the cross correlation function 47 between shifted prototype spectrum 45 (=xs) and input edge spectrum 59 (=y). The peak value of 3 occurs at a prototype shift of zero. If corrected by the above dissimilarity metric, a feature magnitude of −1 is obtained. Normally, feature magnitude is defined such that zero is the minimum value.

The principal deficiency of linear detectors is lack of selectivity in feature detection. This can be remedied to some extent by using more than one prototype spectrum for comparison against the target spectrum. The structure to be detected is therefore allowed to have several "modes". In this scheme, the prototype given the largest correlation peak defines the feature magnitude and direction.

When multiple prototypes are used the detectors are "piecewise linear", since superposition holds only over limited regions of the input edge map. Improvement in feature selectivity is bought with increased memory and run time. However, feature detector 56 (FIG. 3) may, alternatively, be of the nonlinear type. Nonlinear detectors. examples of which are discussed below, have proven superior in both regards.

One such nonlinear detector measures a number of mutually orthogonal edges in an accumulation neighborhood, and is termed EDGE ACTIVITY. The EDGE ACTIVITY detection algorithm can be explained by the following example.

If input edge spectrum x is an 8-vector, each spectrum component $x_i$ will represent a 45° range of edge elements, and components separated by 90° will have indices differing by 2. Therefore, a feature magnitude Q may be defined as:

$$Q = x_1 x_3 + x_2 x_4 + x_3 x_5 + x_4 x_6 + x_5 x_7 + x_6 x_8 + x_7 x_1 + x_8 x_2$$

As defined above, feature magnitude Q will be larger when a large number of mutually orthogonal edges are present. Because $x_{i+8} = x_i$, there is no preferential direction and therefore no directional component to the feature, only a magnitude.

A more efficient implementation can be realized by summing colinear components before multiplication:

$$Q = (x_1 + x_5)(x_3 + x_7) + (x_2 + x_6)(x_4 + x_8).$$

As described above, the EDGE ACTIVITY feature may yield a somewhat distorted result if, for instance, one of the components $x_i$ is relatively large in comparison with its multiplier. An improved EDGE ACTIVITY algorithm can be defined as follows:

$$Q = \text{minimum } [(x_1+x_5),(x_3+x_7)] + \text{minimum } [(x_2+x_6),(x_4+x_8)]$$

Calculation of Q in this manner makes sure that the presence of one spectrum component of large magnitude does not distort the results. By taking a minimum, the magnitude of a mutually orthogonal pair is made to be the same as the magnitude of the shortest component of that pair.

Also, the improved algorithm avoids computationally expensive multiplication steps and reduces the possible range of Q. Thus, the new algorithm has some advantage relative to the terms of performance and run time.

It should be noted that, while EDGE ACTIVITY has been described for a division of x into eight components. the algorithm holds true for finer angular divisions, such as where n equals 16 or 32.

By replacing much slower autocorrelation techniques, EDGE ACTIVITY makes an exhaustive search for optimum correlation targets feasible. EDGE ACTIVITY has been found to be useful for locating "busy" regions of a target, such as the tail structure of an E2C aircraft. Since straight edges of orthogonal relationship occur much more frequently in man-made structures than natural ones, EDGE ACTIVITY also has such applications as identifying road intersections during the overflight of terrain by self-navigating missiles and aircraft, and identifying high-value targets (e.g., tanks) as targets for missiles to home in on.

Appendix B sets out a FORTRAN listing for an EDGE ACTIVITY program.

A further feature detector, termed UTURN, detects structural reversals in edge maps. This property makes UTURN useful in the detection of such structures as the wing tips of aircraft, where the aircraft are viewed edge-on as in landing on aircraft carrier 10 (FIG. 1). When used in conjunction with the higher level logic hereinafter described, UTURN has been successful in identifying which type of aircraft is landing. For this purpose, the size of the edge map neighborhood chosen for the accumulation of a corresponding spectrum is an important design consideration; the neighborhood must be large enough so that an aircraft wing tip will fit, but not so large that the wing tip will be lost in extraneous detail.

The operation of UTURN may be best described by the following examples.

FIG. 8 shows a simple target structure 46 inside of an accumulation neighborhood 48. Three edges 50, 51 and 52 are defined according to the convention discussed above. The edge map corresponding to FIG. 8 would show only edges 50-52.

FIG. 9 shows the edge spectrum corresponding to the target structure shown in FIG. 8. Edges 50-52 show themselves accumulated at bin numbers 1, 3 and 5, respectively, with a notable gap in components occurring at positions 6, 7 and 8. These bin positions correspond to 225°, 270°, and 315°.

UTURN detects the absence of spectrum components at positions 6, 7 and 8, and defines the direction of the gap as a function of the average of the bin or position numbers. The direction of the reversal feature or "U" thus detected is calculated by averaging the bin numbers of the gap—here equal to 7 or 270°—and subtracting a number of bins equivalent to 90°. The direction of the gap in this instance is 5, or 180°, which is the same as the opening of the "U" structure 46 illustrated in FIG.

When the gap is of width 4, the center is calculated using the average of the two middle components. It is necessary in averaging to use contiguous bin numbers or the associated angles. For example, if the gap is comprised of bins 7, 8 and 1, bin 1 is converted to 9 before averaging. Alternatively bins 7 and 8 could have been computed to −1 and 0, respectively. Equivalent results are obtained since bin 0 is identical to bin 8.

Preliminary evaluation has shown that this algorithm is effective in detecting edge reversal features but also responds where inappropriate. In order to make the detector more selective, use of a lookup table is inserted into the algorithm before the structural feature magnitude is computed. Use of the lookup table makes the UTURN algorithm faster, as many calculations of non-zero magnitude and direction are thus avoided.

The lookup table contains values of a fairly sophisticated discriminant function. The function is evaluated by accessing the table with an address computed from the quantized edge spectrum. The table provides two outputs: (1) a binary indicator and (2) a feature direction. If the indicator is zero, feature magnitude is zero and processing of the edge spectrum is complete. If the indicator is 1, magnitude is determined by a method described below.

The address to the appropriate table entry is obtained by quantizing the components of x. With n=8, this amounts to an eight-bit binary number. The quantization rule is:

| COMPONENT VALUE | |
|---|---|
| BEFORE QUANTIZATION | AFTER QUANTIZATION |
| 0–1 | 0 |
| 2, 3, . . . , M | 1 |

The table has, for an eight bit address, 256 entries for feature direction and 256 corresponding entries for the binary indicator. The entries for feature direction are computed according to the gap position, in a manner described previously. The entries for the binary indicator are computed as follows. An entry is one if and only if all of the following are true of the corresponding edge spectrum type:

1. There is a gap of 3 or 4 spectrum components of relatively low magnitude.
2. There is, at most, one gap of width 2 or greater.
3. The quantized spectrum has at least 3 but no more than 5 nonzero components.
4. If the quantized spectrum has exactly three nonzero components, these occur at consecutive bin offsets.

If any of these conditions is not met, zero is assigned as the indicator at that address. Among the 256 possible entries, this occurs more than eighty percent of the time. When the indicator is zero, feature direction is not computed.

Where the table returns a binary indicator of one, the algorithm proceeds to compute an edge reversal feature magnitude as the arithmetic product of a size discriminant and a symmetry discriminant. Both are functions of the unquantized edge spectrum and range in this embodiment from zero to one.

FIG. 11 is a graph of an exemplary size discriminant function for M=49, M being the number of pixels in the chosen accumulation neighborhood. The size of the detected feature is defined as the sum of the elements of input spectrum x and may range from zero to M. The discriminant is one when the feature size equals a nominal value and decreases monotonically for deviations from nominal. In FIG. 10. nominal was chosen as M/2. The discriminant remains near unity for deviations up to $\pm\sqrt{M}$ but decreases rapidly after that.

The other component of the edge reversal feature magnitude, the symmetry discriminant, measures the equality of the lines bounding the opening of the "U" formed by the feature. The symmetry discriminant is based on an inference in which edge elements of a given direction in a neighborhood are reconstructed to link end-to-end to form a line with that direction. As shown by FIGS. 12a and 12b, this may not be the correct reconstruction. Both edge maps have the same symmetry discriminant—the result of the dependence of the discriminant on the relative lengths of the horizontal members 54 and independence from the length of the vertical member 55. The inherent ambiguity is not detrimental in this case, as the symmetry discriminant for both bases still calculates the relative lengths of the horizontal members.

Assuming edge directions appropriate to a bright object on a dark background, the horizontal members 54 of FIG. 12a are shown summed in FIG. 13. As reconstructed, the 0° side is right-going and the 180° side is left-going. Denoting the lengths of these sides as RIGHT and LEFT, respectively, the symmetry discriminant is defined as:

$\psi$ = Minimum [RIGHT, LEFT]/Maximum [RIGHT,LEFT]

Note $\psi$ is 1 if and only if RIGHT and LEFT are equal and is zero if either is zero. In FIG. 13, $\psi$ is equal to 0.7.

FIGS. 14 and 15 show a view of a target structure 82 and a corresponding edge spectrum containing diagonal members 84, 86 and 88. When diagonal members 86, 88 are present, they contribute components to RIGHT or LEFT, according to their projections on the horizontal, as previously defined by the direction of the "U" feature. The contribution is to RIGHT if the diagonal is at ±45°, and to LEFT otherwise. The projection is obtained by multiplying the length of the diagonal member by $1/\sqrt{2}$; in practice, $1/\sqrt{2}$ is approximated by a rational number. In cases where n is not equal to eight or where the direction of the UTURN feature is not a multiple of 45°, the projection which is colinear to the feature direction is a function of the cosine of the component angle to that direction.

The result of the operation of UTURN upon any one neighborhood inside the image is the possible return of an edge reversal feature having a magnitude and a direction, where the magnitude is computed as the product of the above size discriminant and symmetry discriminant.

Appendix C shows a FORTRAN listing for the UTURN feature detector.

FIG. 6 shows edge map elements 90 of an A7 aircraft identified by UTURN as edge reversal features.

Due to neighborhood overlap, the edge reversal feature will be nonzero at several adjacent points in the vicinity of an actual edge reversal, such as an aircraft wingtip. While this is advantageous for feature detection, it is undesirable for localization. What is wanted is a single nonzero feature within an area of diameter D. This is accomplished by purging edge reversal features of submaximal magnitudes from the area. The purging algorithm does this by comparing pairs of points, each feature having assigned to it a point location within distance D of each other and setting the feature of smaller magnitude to zero.

Purging may be advantageously performed in two stages. In the first, comparisons are restricted to the same row of pixels of the image. The left-most feature point is called the "base point" and the right-most point is called the "test point". If the base point is purged, the next nonzero point to its right is taken at the new base point and the following point is taken at the test point. Conversely, if the test point is purged, the following point is taken as the new test point. If neither is purged (a tie situation in terms of feature magnitude) the test point is advanced as if it had been purged. If the advance of the test point then causes the distance to the base point to exceed D, both the base point and the test point are relocated as though the base point had been purged.

When all test points on the row have been exhausted in this manner, the base point is relocated to the first nonzero point on the next row and the test point is taken at the following point. First stage purging terminates when all rows have been similarly processed.

In the second stage, points on different rows are compared. Since the image is very sparse at this point in processing, it is much more efficient to store only the nonzero points. This may be done by storing point descriptions as chains, one per row of the image. If row I has k nonzero points, the chains for row I will have k links. Each link has three parts: (1) the column index of the point, (2) the value of the point and (3) the address of the next link. The location of the first link is kept separately in a table.

Another advantage of this link representation is improved speed. Since zero-value points are not processed by the algorithm, a major source of overhead is eliminated. lhus, typically, 99.8% of the original image need not be processed.

The second stage of purging need only be generally described, as it in general follows the first purging stage but incorporates numerous bookkeeping details of limited value in describing the invention. If the base point is (I,J) and the test point resides on a row II>I, the integers I, J and II determine the smallest and largest columns, JMIN and JMAX, on II that are within distance D of (I,J). Only links of the II chain resulting from the first processing stage between these limits are considered as test points. The base and test points are relocated according to the results of the comparison in a manner not unlike that described in the first processing stage, except that the row of the test point is also advanced until II>I+D.

When purging is complete, only a handful of points remain, which, considered in pairs, are candidates for wingtip locations or other end features of the object in the image. Most candidates can be eliminated by constraints on the direction of the edge reversal magnitude. If, e.g., the aircraft has no roll, the direction of the edge reversal magnitude will be 0° at the left wingtip and 180° at the right wingtip. Further, a line connecting the left to the right will be horizontal.

With roll, all three directions are shifted by the roll angle. The roll angle of the image object can be inferred from the edge spectrum (as in FIG. 10) or from the edge map's Hough transform. Candidate pairs can be tested against these constraints.

The complexity of the pairing test is approximately linear relative to the number of feature points. First, a candidate for the left wingtip is picked. This will define a direction to the right wingtip, and only feature points in this direction are tested. Should one be found, the direction of the feature is compared to that of the first point. For the points to survive as a pair, their feature directions must differ by 180°.

In this way, candidates are purged until only one or a few feature pairs survive. In the event that more than one feature pair qualifies, some predetermined estimate of wingspan as measured in input image coordinates can be used to resolve the ambiguity.

The predetermined estimate is based on a range estimate as from scope and range finder 15 (FIG. 2) and knowledge of the wingspans of all possible landing aircraft. On current aircraft carriers, these are the A6, A7, E2C and F15. The wingspans are converted to image coordinates using a range estimate and the parameters of the optical system employed. With range known accurately, as from a laser range finder, wingspan in the image could be specified to +36% to −34% of the mean of the aircraft wingspans. With range less precisely known, say to ±10%, the limits of permissible distance between edge reversal features would increase to +49% to −41%.

The accuracy of estimating wingspan by this technique has been investigated experimentally. As compared to measurements made by eye using a joystick utility on the Grinnell display system, agreement was better than 1 pixel in 104.

The foregoing exemplary description of the invention illustrates the general concept of accumulating a series of edge spectra for corresponding neighborhoods of an input image, analyzing the spectra by means of any of several feature detectors to detect structural features of the image, and applying higher-level logic in using such features to identify one or more objects in the image.

The invention is not limited to the illustrated feature detectors, imaging system or to the illustrated application of identifying landing aircraft. It has application wherever fast or low system overhead image identification is required. As has been mentioned, applications include recognition of man-made structures for reconnaissance purposes or as targets for munitions.

Another application occurs in these missiles that have a bad transient "wobble" upon takeoff, but rely on scene imaging for auto-navigation. The "wobble" will cause the missile's image identification system to temporarily lose its "lock" on terrain signposts it is using for navigation. The invention identifies "busy" terrain features fast enough that, once scene information has been loaded, a terrain structure can be quickly reidentified for reorientation of the missile. Conventional adaptiVe gate centroid trackers are generally unable to do this.

Other applications occur in part identification and orientation in robotics, and optical character recognition systems. Feature detectors can also include a detector of parallel lines for such structures as roads or cultivated fields; this detector is designed generally along the lines of the other nonlinear detectors described above.

Although the preferred embodiments have been described in detail, it should be understood that various changes, substitutions and alterations can be made therein without departing from the spirit and scope of the invention as defined by the appended claims.

APPENDIX C

```
C     PROGRAM: FEXTR (ORIGINAL CODE:3/2/84)
C     ORIGIN: [CHOATE.OCR]ESPEC
C     EXTRACTS FEATURE FROM EDGE SPECTRUM.  THIS VERSION
C     DETECTS "U-TURN" -FEATURE
      CHARACTER*128 FILENAME,BLANK
      CHARACTER*1 DECISION,FNAME(128),BLNK(128)
      EQUIVALENCE(FILENAME,FNAME),(BLANK,BLNK)
      DATA BLNK/128*' '/
      INTEGER DIR1,DIR2
      INTEGER*2 NAMELENGTH,IERR,LUN,NUMREC,NUMREADIN,NUMWRITTEN
      INTEGER*2 SPECT(0:7,128,256),LOOKUP(0:255),FVAL(0:255)
      BYTE FMAG(128,256),FDIR(128,256),KD1(0:255),KD2(0:255)
      DATA FMAG,FDIR/65536*0/
```

```
      REAL SIZE(0:49)             !49 MAX NUMBER OF PIXELS IN 7X7
      COMMON/UIONAME/FILENAME
      COMMON/UIOLEN/NAMELENGTH
      COMMON/FEATURE/SIZE,FVAL,KD1,KD2          !USED WITH SUBR FEAT1
      COMMON/ARRAY/FMAG,FDIR,FDUM       !USED WITH SUBROUTINE ARRAY

C     CONSTRUCT LOOKUP TABLE FOR BYTE ENCODING
      DO K=0,127
          LOOKUP(K)=K
      END DO
      DO K=128,255
          LOOKUP(K)=K-256
      END DO

C     CONSTRUCT LOOKUP TABLES USED BY FEATURE EXTRACTION SUBROUTINE
      CALL SCREEN(FVAL,KD1,KD2)
      DO N=0,49
          SIZE(N)=1./(1.+((N-24.5)/10.)**6)
      END DO

TYPE*,' Specify name of edge spectrum file to be processed'
      READ(5,60)FILENAME
 60   FORMAT(A128)

CALL READGRIN(SPECT)
      FMAX=0.
C     EVALUATE U-TURN FEATURE
      DO I=1,128
          DO J=1,256
              CALL FEAT2(I,J,SPECT,F,DIR1,DIR2)
              IF(F.GT.FMAX)FMAX=F
              FMAG(I,J)=100.*F
              FDIR(I,J)=DIR1
C********FOLLOWING SUPPORTS DEBUGGING
              IF(I.EQ.ITRAP.AND.J.EQ.JTRAP)THEN
                  IXYZ=1          !DUMMY STMT TO SET BREAKPOINT
              END IF
C********
          END DO
      END DO
C     ENCODE FOR DISPLAY BY SCALING FROM 0 TO 15 AND
C     BIASING WITH 16*K+32, WHERE K IS DIRECTION INDEX
      COEF=15./(100.*FMAX)
      DO I=1,128
          DO J=1,256
              IDUMMY=FDIR(I,J)
              BASE=IDUMMY*16+32 !NOTE: MINIMUM VALUE = 32 ASSURED
              FTEMP=COEF*FMAG(I,J)+BASE
C             SINCE FMAG IS BYTE, MUST MAP VALUES >127 AS NEGATIVES
              FMAG(I,J)=LOOKUP(JNINT(FTEMP))
          END DO
      END DO
C     NOTE: FMAGE HAS ALSO BEEN PLACED IN GRINNELL FORMAT
C     CLEAR FILENAME FOR WRITE
      FILENAME=BLANK
      TYPE*,' Specify name of file for U-TURN  feature'
      READ(5,60)FILENAME
      CALL FWRITE(FMAG)
      END SUBROUTINE FWRITE(FMAG)
      CHARACTER*128 FILENAME
      CHARACTER*1 CTRL
      INTEGER*2 NAMELENGTH,IERR,LUN,NUMREC,NUMREADIN,NUMWRITTEN
      INTEGER*4 RECNUM,STAT,LIB$GET_LUN,Q,QSTART
      BYTE FMAG(128,256),IB(512)
      COMMON/UIONAME/FILENAME
      COMMON/UIOLEN/NAMELENGTH TYPE*,' Wish to zoom output image by 2?  If so, enter "Y"'
      READ(5,8)CTRL
 8    FORMAT(A1)
```

```
        LUN=56
        CALL UOPENN(LUN,FILENAME,IERR)   !OPEN NEW FILE
        IF(IERR.NE.1)THEN
           TYPE*,' ERROR ON OPENING, IER = ',IER
           STOP
        END IF

C       SET WRITE BUFFER TO BASE LEVEL
        DO J=1,512
           IB(J)=32
        END DO

IF(CTRL.EQ.'Y'.OR.CTRL.EQ.'y')GO TO 20
C       WRITE 192 ROWS OF BASE LEVEL
        DO I=1,192
           CALL UWRITE(LUN,I,1,IB,NUMWRITTEN,IERR)
           IF(IERR.NE.1)THEN
              TYPE*,' ERROR ON WZ1, IERR = ',IERR
              STOP
           END IF
        END DO
C       WRITE 128 ROWS OF DATA
        DO I=193,320
           II=I-192
           DO J=129,384
              IB(J)=FMAG(II,J-128)
           END DO
           CALL UWRITE(LUN,I,1,IB,NUMWRITTEN,IERR)
           IF(IERR.NE.1)THEN
              TYPE*,' ERROR ON WZ1, IERR = ',IERR
              STOP
           END IF
        END DO
C       RESTORE WRITE BUFFER TO BASE LEVEL
        DO J=1,512
           IB(J)=32
        END DO

C       WRITE FINAL 192 LINE OF BASE LEVEL
        DO I=321,512
           CALL UWRITE(LUN,I,1,IB,NUMWRITTEN,IERR)
           IF(IERR.NE.1)THEN
              TYPE*,' ERROR ON WZ2, IERR = ',IERR
              STOP
           END IF
        END DO

CALL UCLOSE(LUN,IERR)
        IF(IERR.NE.1)STOP '  ERROR ON CLOSING'
        RETURN

20      CONTINUE           !FOLLOWING IS ZOOM OPTION:
C       WRITE 128 ROWS OF BASE LEVEL
        DO I=1,128
           CALL UWRITE(LUN,I,1,IB,NUMWRITTEN,IERR)
           IF(IERR.NE.1)THEN
              TYPE*,' ERROR ON WZ1, IERR = ',IERR
              STOP
           END IF
        END DO
C       WRITE 256 ROWS OF ZOOMED DATA
        DO I=1,128
           II=2*(I-1)+129
           DO J=1,256
              DO K=1,2
                 JJ=2*(J-1)+K
                 IB(JJ)=FMAG(I,J)
              END DO
           END DO
           CALL UWRITE(LUN,II,1,IB,NUMWRITTEN,IERR)
           IF(IERR.NE.1)THEN
```

```
            TYPE*,'  ERROR ON WZ1, IERR = ',IERR
            STOP
        END IF
        CALL UWRITE(LUN,II+1,1,IB,NUMWRITTEN,IERR)
        IF(IERR.NE.1)THEN
            TYPE*,'  ERROR ON WZ1, IERR = ',IERR
            STOP
        END IF
    END DO

C   RESTORE WRITE BUFFER TO BASE LEVEL
    DO J=1,512
        IB(J)=32
    END DO

C   WRITE FINAL 128 LINES OF BASE LEVEL
    DO I=385,512
        CALL UWRITE(LUN,I,1,IB,NUMWRITTEN,IERR)
        IF(IERR.NE.1)THEN
            TYPE*,'  ERROR ON WZ2, IERR = ',IERR
            STOP
        END IF
    END DO

CALL UCLOSE(LUN,IERR)
    IF(IERR.NE.1)STOP '  ERROR ON CLOSING'
    RETURN
    END

SUBROUTINE READGRIN(SPECT)
    CHARACTER*128 FILENAME
    INTEGER*2 NAMELENGTH,IERR,LUN,NUMREC,NUMREADIN,NUMWRITTEN
    INTEGER*2 SPECT(8,128,256),LOOKUP(-128:127)
    INTEGER*4 RECNUM,STAT,LIB$GET_LUN
    BYTE IB(512)
    COMMON/UIONAME/FILENAME
    COMMON/UIOLEN/NAMELENGTH

C   CONSTRUCT LOOKUP TABLE FOR BYTE DECODING
    DO J=-128,-1
        LOOKUP(J)=J+256
    END DO
    DO J=0,127
        LOOKUP(J)=J
    END DO

LUN =56
    CALL UOPENO(LUN,FILENAME,IERR)
    IF (IERR.NE.1)THEN
        TYPE*,'  IERR ON OPENING FOR TEST = ',IERR
        STOP
    END IF

ICOUNT=0
    DO K=0,3
        M=2*K+1
        N=M+1
        DO I=1,128
            ICOUNT=ICOUNT+1
            CALL UREAD(LUN,ICOUNT,1,IB,NUMREADIN,IERR)
            IF(IERR.NE.1) THEN
                TYPE*,'  IERR @UREAD = ',IERR
                STOP
            END IF
            DO J=1,256
                SPECT(M,I,J)=LOOKUP(IB(J))
                SPECT(N,I,J)=LOOKUP(IB(J+256))
            END DO
        END DO
    END DO
```

```
      CALL UCLOSE(LUN,IERR)
      IF(IERR.NE.1)THEN
          TYPE*,'  IERR @UCLOSE = ',IERR
          STOP
      END IF
      RETURN
      END
      SUBROUTINE FEAT2(I,J,SPECT,F,DIR1,DIR2)
C     MODIFIED FROM 3/28/84 VERSION OF INTERAC TO GIVE DIRECTION BY
C     INTEGERS DIR1 AND DIR2, INSTEAD OF IN DEGREES.  RELATION GIVEN
C     BY:   DIRECTION = DIR1*45+DIR2*22.5,  WHERE DIR2 = 0 OR 1
C     COMPUTES NEW UTURN FEATURE FROM SPECT(*,I,J)
C     "SIZE" ,"FVAL", "KD1" AND "KD2" ARE PASSED FROM CALLING PROGRAM
C     "SIZE" VALID FOR 7X7 (49 PIXEL) NEIGHBORHOOD

INTEGER SUM,TH,SM1,S0,SP1,DIR1,DIR2
      INTEGER*2 SPECT(0:7,128,256),FVAL(0:255),IPAT(0:7)
      BYTE KD1(0:255),KD2(0:255)
      REAL RIGHT,LEFT,SIZE(0:49)
      COMMON/FEATURE/SIZE,FVAL,KD1,KD2

TH=1              !USE USED TO OBTAIN BINARY SPECTRAL PATTERN IPAT(0:7)
C     BINARY QUANTIZE SPECTRUM
      DO K=0,7
          IF(SPECT(K,I,J).GT.TH)THEN
              IPAT(K)=1
          ELSE
              IPAT(K)=0
          END IF
      END DO
      N=NUMB(IPAT(0),IPAT(1),IPAT(2),IPAT(3),IPAT(4),IPAT(5),
    1 IPAT(6),IPAT(7))
      IF(FVAL(N).EQ.0)THEN
          F=0
          D=0.
          RETURN
      ELSE
          SUM=0
          DO K=0,7
              SUM=SUM+SPECT(K,I,J)
          END DO
          IF(SUM.LT.10.OR.SUM.GT.39)THEN
              F=0.
              D=0.
              RETURN
          END IF
      END IF
      K1=KD1(N)
      K2=KD2(N)

IF(K1.EQ.K2)THEN
          KREF=JMOD(K1+6,8)
          N1=JMOD(KREF+4,8)
          N2=JMOD(KREF+5,8)
          N3=JMOD(KREF+7,8)
          LEFT=3*SPECT(N1,I,J)+2*SPECT(N2,I,J)
          RIGHT=3*SPECT(KREF,I,J)+2*SPECT(N3,I,J)
          F=SIZE(SUM)*AMIN1(LEFT,RIGHT)/AMAX1(LEFT,RIGHT)
          DIR1=JMOD(K1+6,8)
          DIR2=0
          RETURN
      ELSE
          IF(K2.EQ.JMOD(K1+1,8))THEN
              KREF=JMOD(K1+6,8)
              N1=JMOD(KREF+5,8)
              N2=JMOD(KREF+6,8)
              N3=JMOD(KREF+7,8)
              LEFT=12*SPECT(N1,I,J)+5*SPECT(N2,I,J)
              RIGHT=12*SPECT(KREF,I,J)+5*SPECT(N3,I,J)
              F=SIZE(SUM)*AMIN1(LEFT,RIGHT)/AMAX1(LEFT,RIGHT)
              DIR1=JMOD(K1+6,8)
              DIR2=1
```

```
            RETURN
        ELSE
            F=0.
            RETURN
        END IF
    END IF
END

SUBROUTINE SCREEN(FVAL,KD1,KD2)
    INTEGER*2 FVAL(0:255),I(-1:8)
    BYTE KD1(0:255),KD2(0:255)

C   NOTE KD1 AND KD2 ARE RELATED TO DIRECTION OF OPENING AS FOLLOWS:
C   DIRECTION = KD1*45-90.+22.5*(KD2-KD1)

DO I0=0,1
        I(0)=I0
        I(8)=I(0)
        DO I1=0,1
            I(1)=I1
            DO I2=0,1
                I(2)=I2
                DO I3=0,1
                    I(3)=I3
                    DO I4=0,1
                        I(4)=I4
                        DO I5=0,1
                            I(5)=I5
                            DO I6=0,1
                                I(6)=I6
                                DO I7=0,1
                                    I(7)=I7
                                    I(-1)=I(7)
                                    N=NUMB(I0,I1,I2,I3,I4,I5,I6,I7)
    ISUM=0
    ISTAT=0
    FVAL(N)=1
    NTRIPLE=0
    KD1(N)=-1
    DO K=0,7
        IF(I(K-1).EQ.0.AND.I(K).EQ.0.AND.I(K+1).EQ.0)THEN
            NTRIPLE=1
            IF(KD1(N).LT.0)THEN
                KD1(N)=K
                KD2(N)=K
            ELSE
                KD2(N)=K
            END IF
        END IF
        IF(I(K-1).EQ.0.AND.I(K).EQ.0.AND.I(K+1).EQ.1)THEN
            IF(ISTAT.EQ.1)FVAL(N)=0    !ALLOW AT MOST 1 SEPARATED
            IF(ISTAT.EQ.0)ISTAT=1      !GROUP OF 2 OR MORE ZEROES
        END IF
        ISUM=ISUM+I(K)
    END DO
    IF(ISUM.LE.2.OR.ISUM.GE.6)FVAL(N)=0    !MIN 3 ZEROES/ASTERISKS
    IF(NTRIPLE.EQ.0)FVAL(N)=0
    IF(FVAL(N).EQ.0)THEN
        KD1(N)=0
        KD2(N)=0
    END IF
                                END DO
                            END DO
                        END DO
                    END DO
                END DO
            END DO
        END DO
    END DO
    RETURN
    END
```

```
      INTEGER FUNCTION NUMB(I0,I1,I2,I3,I4,I5,I6,I7)
      INTEGER*2 I0,I1,I2,I3,I4,I5,I6,I7
      NUMB=I0+2*I1+4*I2+8*I3+16*I4+32*I5+64*I6+128*I7
      RETURN
      END

SUBROUTINE ARRAY           !USE AS ADJUNCT OF SYMBOLIC DEBUGGER
      CHARACTER*1 CHAR
      REAL FDUM(128,256)
      INTEGER*2 LOOKUP(-128:127),WDUM(256)
      BYTE FMAG(128,256),FDIR(128,256)
      COMMON/ARRAY/FMAG,FDIR,FDUM

C     CONSTRUCT LOOKUP TABLE FOR BYTE DECODING
      DO J=-128,-1
         LOOKUP(J)=J+256
      END DO
      DO J=0,127
         LOOKUP(J)=J
      END DO

TYPE*,' To write unscaled feature magnitude enter "F"'
      TYPE*,' To write feature magnitude enter "M"'
      TYPE*,' To write feature direction enter "D"'
      TYPE*,' Another entry aborts this subroutine.'
      READ(5,1)CHAR
   1  FORMAT(A1)
      IF(CHAR.NE.'M'.AND.CHAR.NE.'D'.AND.CHAR.NE.'F')RETURN
      TYPE*,' Enter row and column of center pixel of neighborhood'
      READ(5,*)IN,JN
      DO I=IN-3,IN+3
         IF(CHAR.EQ.'M')THEN
            DO J=JN-3,JN+3
               WDUM(J)=LOOKUP(FMAG(I,J))
               WDUM(J)=IMOD(WDUM(J),16)
            END DO
            WRITE(6,67)(WDUM(J),J=JN-3,JN+3)
         END IF
         IF(CHAR.EQ.'D')WRITE(6,67)(FDIR(I,J),J=JN-3,JN+3)
         IF(CHAR.EQ.'F')WRITE(6,68)(FDUM(I,J),J=JN-3,JN+3)
  67     FORMAT(16(2X,I2))
  68     FORMAT(7(2X,F8.0))
      END DO
      RETURN
      END SUBROUTINE SCAN(FMAG,FDIR)
C     USED FOR DEBUGING - SCANS BETWEEN ENDPOINTS AND WRITE FMAG AND FDIR
      CHARACTER*1 CTRL
      BYTE FMAG(128,256),FDIR(128,256)

XLL=83            !temporary target box coordinate specs
      YLL=103           !temporary
      XUR=191           !temporary
      YUR=142           !temporary

ILR=512-YLL
      JUL=XLL+1
      IUL=512-YUR
      JLR=XUR+1

C     CENTER 128X256 SUBARRAY VERTICALLY ON TARGET BOX WITHIN
C     LEFT OR RIGHT HALF OF IMAGE
      IF(IUL.LT.1.OR.IUL.GT.ILR.OR.ILR.GT.512.OR.JUL.LT.1.OR.
     1   JUL.GT.JLR.OR.JLR.GT.512)STOP ' BOX COORD S OUT OF SPEC'
      IF(JUL.LT.256.AND.JLR.GT.256)STOP
     1   ' BOX SPLITS VERT CENTER LINE'
      MARG=128-(ILR-IUL+1)       !SPARE ROWS
      IF(MARG.LT.0)STOP ' TARGET BOX WONT FIT BUFFER'
      TOP=MARG/2                 !MARGIN ALLOCATED ABOVE
      BOT=MARG-TOP               !MARGIN ALLOCATED BELOW
```

```
         ITOP=IUL-TOP
         IBOT=ILR+BOT
         IF(ITOP.LT.1)THEN
            IBOT=128
            ITOP=1
         END IF
         IF(IBOT.GT.512)THEN
            ITOP=385
            IBOT=512
         END IF

IF(JLR.LE.256)THEN
            JSTART=1
            JSTOP=256
         ELSE
            JSTART=257
            JSTOP=512
         END IF
   1     TYPE*,' Specify screen coordinates of left point'
         READ(5,*)XL,YL
         TYPE*,' Specify screen coordinates of right point'
         READ(5,*)XR,YR

WRITE(6,*)' END POINTS OF TRAVERSE: ',XL,YL,' AND ',XR,YR

DO N=0,100
         F=N/100.
         IF(F.GT.1..OR.F.LT.0)STOP
         X=ININT((1.-F)*XL+F*XR)
         Y=ININT((1.-F)*YL+F*YR)
         I=512-ITOP-Y
         J=X+2-JSTART
         WRITE(6,50)FMAG(I,J),FDIR(I,J)
   50    FORMAT(' FMAG = ',I3,'  FDIR = ',I3)
         END DO
         TYPE*,' ENTER "C" TO RESCAN "R" TO RETURN'
         READ(5,5)CTRL
   5     FORMAT(A1)
         IF(CTRL.EQ.'C')GO TO 1
         RETURN
         END
```

*APPENDIX A*

```
C     PROGRAM: EDGE
C     DERIVED FROM [CHOATE.SHIPS]ESPEC2.FOR ON 15 NOV 83
C     A FAST RECURSIVE ALGORITHM FOR COMPUTING ORTHOGONAL COMPONENTS
C     R AND S OF EDGE MAP (SEE EDGE SPECTRUM IMAGE ANALYSIS)
C     AND EVALUATING FEATURES FOR CORRELATION TRACKING
C     DERIVATIVE OF ESPEC BUT DOES NOT BREAK UP READING AND WRITING
C     OF INTERMEDIATE IMAGES.  OUTPUT OVERWRITES INPUT IMAGE.
      INTEGER XLL,YLL,XUR,YUR
      INTEGER*2 IMAGE(512,512),R(256,256), S(256,256),DSPL(256,256),TH,Q
      INTEGER*2 X(4,256,256),XBUF(4,256),TBL(0:8)
      INTEGER HISTO(0:1023),A1,A2
      INTEGER*2 RDUM,SDUM
C     TBL TRANSLATES EDGE DIRECTIONS TO OUTPUT LEVELS
      DATA TBL/32,60,88,116,144,172,200,228,255/
      DATA HISTO/1024*0/

CHARACTER*128 FILENAME
      CHARACTER*1 FNAME(128)
      EQUIVALENCE(FILENAME,FNAME)
      INTEGER*2 NAMELENGTH,IERR,LUN,NUMREC,NUMREADIN,NUMWRITTEN
      INTEGER*4 RECNUM
      COMMON/UIONAME/FILENAME
      COMMON/UIOLEN/NAMELENGTH

ITOP=1           !1ST ROW ASSUMED VALID IN PREPROCESSED IMAGE
      IBOTTOM=511      !LAST ROW ASSUMED VALID IN PREPROCESSED IMAGE
      NPROC=0          !NUMBER OF INPUT FILES PROCESSED TO DATE
```

```
        NFILES=1                      !NUMBER OF FILES TO BE PROCESSED
100     CONTINUE

TYPE*,' Enter coordinates of pixel in lower left corner '
        TYPE*,' of target box (XLL,YLL)'
        READ(5,*)XLL,YLL
        TYPE*,' Enter coordinates of pixel in upper right corner '
        TYPE*,' of target box (XUR,YUR)'
        READ(5,*)XUR,YUR
        IF(XLL.GT.XUR.OR.YLL.GT.YUR)STOP
    1   ' Error in specification of target box'

C       CONVERT SCREEN COORDINATES INTO ARRAY COORDINATES
        ILR=512-YLL
        JUL=XLL+1
        IUL=512-YUR
        JLR=XUR+1

TYPE*,' Enter dimension of feature template, must be odd integer'
        READ(5,*)MM
        M=MM/2
        IF(2*M+1.NE.MM)STOP ' Entry is not an odd integer'
        MARG=M+1          !MARGIN REQUIRED FOR FULL PROCESSING OF TARGET BOX C       DEFINE BOX CONTAINING DATA TO BE PROCESSED.  IF OUT OF RANGE,
C       ADJUST (IUL,JUL) AND (ILR,JLR) ACCORDINGLY.
        IIUL=IUL-MARG
        IF(IIUL.LT.ITOP)THEN
           IIUL=ITOP
           IUL=ITOP+MARG
           TYPE*,'  IUL changed to',IUL
        END IF
        JJUL=JUL-MARG
        IF(JJUL.LT.1)THEN
           JJUL=1
           JUL=JJUL+MARG
           TYPE*,'  JUL changed to',JUL
        END IF
        IILR=ILR+MARG
        IF(IILR.GT.IBOTTOM)THEN
           IILR=IBOTTOM
           ILR=IILR-MARG
           TYPE*,'  ILR changed to',ILR
        END IF
        JJLR=JLR+MARG
        IF(JJLR.GT.512)THEN
           JJLR=512
           JLR=JJLR-MARG
           TYPE*,'  JLR changed to',JLR
        END IF ISTART=MARG+1
        ISTOP=ISTART+ILR-IUL
        JSTART=MARG+1
        JSTOP=JSTART+JLR-JUL
        ISIZE=IILR-IIUL+1
        JSIZE=JJLR-JJUL+1

CALL READGRIN(IMAGE)

C       APPLY SOBEL OPERATOR (RECURSIVE VERSION):
C       PROCESS HORIZONTALLY WITH (1 1)
        DO I=IIUL,IILR
           II=I-IIUL+1
           DO J=JJUL,JJLR-1
              S(II,J-JJUL+1)=IMAGE(I,J)+IMAGE(I,J+1)
           END DO
        END DO
C       PROCESS VERTICALLY WITH (1 1) TRANSPOSED
        DO J=1,JSIZE-1
        DO I=1,ISIZE-1
```

```
      S(I,J)=S(I,J)+S(I+1,J)
      END DO
      END DO
C     PROCESS HORIZONTALLY WITH (1  1) TO GET R PRECURSOR
      DO I=1,ISIZE-1
      DO J=JSIZE-1,2,-1
      R(I,J)=S(I,J)+S(I,J-1)
      END DO
      END DO
C     PROCESS HORIZONTALLY WITH (1 -1) TO GET S PRECURSOR
      DO I=1,ISIZE-1
      DO J=JSIZE-1,2,-1
      S(I,J)=S(I,J-1)-S(I,J)
      END DO
      END DO
C     PROCESS R PRECURSOR VERTICALLY WITH (1 -1) TRANSPOSED TO GET R
      DO I=ISIZE-1,2,-1
      DO J=2,JSIZE-1
      R(I,J)=R(I-1,J)-R(I,J)
      END DO
      END DO
C     PROCESS S PRECURSOR VERTICALLY WITH (1  1) TRANSPOSED TO GET S
      DO I=ISIZE-1,2,-1
      DO J=2,JSIZE-1
      S(I,J)=S(I-1,J)+S(I,J)
      END DO
      END DO

C     COMPUTE COMPOUND HISTOGRAM OF EDGE STRENGTHS

DO I=ISTART,ISTOP
         DO J=JSTART,JSTOP
            RDUM=IIABS(R(I,J))
            SDUM=IIABS(S(I,J))
            LEVEL=IMAX0(RDUM,SDUM)
            IF(LEVEL.GT.1023)LEVEL=1023
            HISTO(LEVEL)=HISTO(LEVEL)+1
         END DO
      END DO
C     CONVERT TO CUMULATIVE HISTOGRAM
      DO K=1,1023
         HISTO(K)=HISTO(K-1)+HISTO(K)
      END DO
      CALL MINMAX(ISTART,ISTOP,JSTART,JSTOP,R,MINR,MAXR)
      CALL MINMAX(ISTART,ISTOP,JSTART,JSTOP,S,MINS,MAXS)
      TYPE*,'  RANGE OF R-GRADIENT:',MINR,' TO ',MAXR
      TYPE*,'  RANGE OF S-GRADIENT:',MINS,' TO ',MAXS
      MIN=JMIN0(MINR,MINS)
      MAX=JMAX0(MAXR,MAXS)
      CALL SCALE(ISTART,ISTOP,JSTART,JSTOP,R,DSPL,MIN,MAX,32,255)
      CALL FMTDATA(3,ISTART,ISTOP,JSTART,JSTOP,DSPL,IMAGE)
      CALL SCALE(ISTART,ISTOP,JSTART,JSTOP,S,DSPL,MIN,MAX,32,255)
      CALL FMTDATA(4,ISTART,ISTOP,JSTART,JSTOP,DSPL,IMAGE)

C     ELIMINATE WEAK EDGES AND CLASSIFY EDGE DIRECTIONS BY OCTANTS
      TYPE*,'  SPECIFY PERCENTAGE OF EDGES TO SURVIVE THRESHOLDING'
      READ(5,*)PCT
      NREF=(1.-PCT/100.)*HISTO(1023)   !POINTS TO BE BELOW THRESHOLD
      K=1
      A2=HISTO(1)-NREF
      DO WHILE (A2.LT.0)
         K=K+1
         A2=HISTO(K)-NREF
      END DO
      A1=NREF-HISTO(K-1)
      IF(A1.GT.A2)THEN
         TH=K
      ELSE
         TH=K-1
      END IF
      DO I=2,ISIZE-1
      DO J=2,JSIZE-1
```

```
            JS=S(I,J)
            IR=R(I,J)
            IF(IR.GT.TH)THEN
                IF(JS.GE.0)THEN
                    IF(IR.GT.JS)THEN
                        IX=1
                    ELSE
                        IX=2
                    END IF
                ELSE
                    IF(IR.GE.-JS)THEN
                        IX=8
                    ELSE
                        IX=7
                    END IF
                END IF
            ELSE
                IF(IR.LT.-TH)THEN
                    IF(JS.GT.0)THEN
                        IF(-IR.GE.JS)THEN
                            IX=4
                        ELSE
                            IX=3
                        END IF
                    ELSE
                        IF(IR.GE.JS)THEN
                            IX=6
                        ELSE
                            IX=5
                        END IF
                    END IF
                ELSE
                    IF(JS.GT.TH)THEN
                        IF(IR.GT.0)THEN
                            IX=2
                        ELSE
                            IX=3
                        END IF
                    ELSE
                        IF(JS.GE.-TH)THEN
                            IX=0
                        ELSE
                            IF(IR.GE.0)THEN
                                IX=7
                            ELSE
                                IX=6
                            END IF
                        END IF
                    END IF
                END IF
            END IF
            R(I,J)=IX
            DSPL(I,J)=TBL(IX)
            END DO
            END DO

CALL FMTDATA(2,ISTART,ISTOP,JSTART,JSTOP,DSPL,IMAGE)

C           COLLAPSE EDGE DIRECTIONS INTO 4 CATEGORIES
C           FOR FEATURE EVALUATION THIS STEP CAN BE ABSORBED IN PRECEDING
            DO I=2,ISIZE-1
            DO J=2,JSIZE-1
            IF(R(I,J).GT.4)R(I,J)=R(I,J)-4
            END DO
            END DO
C           COMPUTE EDGE FEATURE VECTOR X
C           HORIZONTAL ACCUMULATE
            DO I=2,ISIZE-1
            DO J=2,2*M+2
            IV=R(I,J)
            IF(IV.NE.0)X(IV,I,M+2)=X(IV,I,M+2)+1
            END DO
```

```
              END DO
              DO I=2,ISIZE-1
              DO J=M+2,JSIZE-M-2
              IV1=R(I,J+M+1)
              IV2=R(I,J-M)
              DO K=1,4
              X(K,I,J+1)=X(K,I,J)
              END DO
              IF(IV1.NE.0)X(IV1,I,J+1)=X(IV1,I,J+1)+1
              IF(IV2.NE.0)X(IV2,I,J+1)=X(IV2,I,J+1)-1
              END DO
              END DO

C             VERTICAL ACCUMULATE AND COMPUTATION OF QUALITY FACTOR Q
              DO J=M+2,JSIZE-M-1
              DO K=1,4
              XBUF(K,J)=0
              DO I=2,2*M+2
              XBUF(K,J)=XBUF(K,J)+X(K,I,J)
              END DO
              END DO
              Q=XBUF(1,J)*XBUF(3,J)+XBUF(2,J)*XBUF(4,J)
              DSPL(M+2,J)=Q
              END DO

C             ITERATIVE VERTICAL ACCUMULATION AND SIMULTANEOUS COMPUTATION OF Q
              NP1=M+1
              DO I=M+3,ISIZE-MP1
              DO J=M+2,JSIZE-MP1
              DO K=1,4
              XBUF(K,J)=XBUF(K,J)+X(K,I+M,J)-X(K,I-MP1,J)
              END DO
              Q=XBUF(1,J)*XBUF(3,J)+XBUF(2,J)*XBUF(4,J)
              DSPL(I,J)=Q
              END DO
              END DO
C             SCALE DSPL FOR DISPLAY
              CALL MINMAX(ISTART,ISTOP,JSTART,JSTOP,DSPL,MINQ,MAXQ)
              IF(MINQ.LT.0)STOP '  ERROR CONDITION - NEGATIVE ACCUMULATION'
              TYPE*,'  RANGE OF Q-FACTOR:',MINQ,' TO ',MAXQ
              CALL SCALE(ISTART,ISTOP,JSTART,JSTOP,DSPL,DSPL,MINQ,MAXQ,32,255)
              CALL FMTDATA(1,ISTART,ISTOP,JSTART,JSTOP,DSPL,IMAGE)

C             CONSTRUCT OUTPUT FILENAME BY APPENDING FILETYPE .EDG TO INPUT
C             LOCATE END OF DIRECTORY SPECIFICATION
              NCHARS=1
              DO WHILE(FNAME(NCHARS).NE.']')
                 NCHARS=NCHARS+1
                 IF(NCHARS.GE.128)STOP '  Failure in parcing input filename'
              END DO
C             LOCATE PERIOD SEPARATING FILETYPE
              DO WHILE(FNAME(NCHARS).NE.'.')
                 NCHARS=NCHARS+1
                 IF(NCHARS.GT.128)STOP '  Failure to locate filetype boundary'
              END DO
C             APPEND NEW FILETYPE
              FNAME(NCHARS+1)='E'
              FNAME(NCHARS+2)='D'
              FNAME(NCHARS+3)='G'
              CALL WRITEGRIN(IMAGE)

NPROC=NPROC+1
              IF(NPROC.LT.NFILES)GO TO 100
              STOP
              END

SUBROUTINE WRITEGRIN(IMAGE)
              CHARACTER*128 FILENAME
              INTEGER*2 IMAGE(512,1)
              INTEGER*2 NAMELENGTH,IERR,LUN,NUMREC,NUMREADIN,NUMWRITTEN
              INTEGER*2 IDUM(512)
              INTEGER*4 RECNUM,STAT,LIB$GET_LUN
```

```
      BYTE IB(512),FRM
      COMMON/UIONAME/FILENAME
      COMMON/UIOLEN/NAMELENGTH

TYPE*,' Enter name of output file to Grinnell'
      READ(5,1)FILENAME
    1 FORMAT(A128)
      LUN=56
      CALL UOPENN(LUN,FILENAME,IERR)   !OPEN NEW FILE
      IF(IERR.NE.1)THEN
         TYPE*,' ERROR ON OPENING, IER = ',IER
         STOP
      END IF DO I=1,512
C     CONVERT FROM IMAGE*2 TO BYTE FORMAT OF GRINNELL
         DO J=1,512
            IF(IMAGE(I,J).GE.128)THEN
               IB(J)=IMAGE(I,J)-256
            ELSE
               IB(J)=IMAGE(I,J)
            END IF
         END DO
         CALL UWRITE(LUN,I,1,IB,NUMWRITTEN,IERR)
         IF(IERR.NE.1)THEN
            TYPE*,' FIRST WRITE, IERR = ',IERR
            STOP
         END IF
      END DO CALL UCLOSE(LUN,IERR)
      IF(IERR.NE.1)STOP '   ERROR ON CLOSING'
      RETURN
      END SUBROUTINE FMTDATA(IQUAD,ISTART,ISTOP,JSTART,JSTOP,BUFFER,IMAGE)
      INTEGER*2 BUFFER(256,1),IMAGE(512,1)
C     QUADRANTS DEFINED ACCORDING TO CONVENTION:     2  1
C                                                    3  4
C     MAPPING BASED ON FOLLOWING DATA LOCATIONS:
C     - IN BUFFER: (ISTART,JSTART) TO (ISTOP,JSTOP)
C     - IN OUTPUT: (IBEGIN,JBEGIN) TO (IEND,JEND)
      IF(IQUAD.EQ.1.OR.IQUAD.EQ.2)THEN
         IBIAS=1
      ELSE
         IBIAS=257
      END IF
      IF(IQUAD.EQ.2.OR.IQUAD.EQ.3)THEN
         JBIAS=1
      ELSE
         JBIAS=257
      END IF
C     COMPUTE SIZE OF ARRAY CONTAINING DATA TO BE WRITTEN
      ISIZE=ISTOP-ISTART+1       !DIFFERENT FROM DEFINITION IN MAIN
      JSIZE=JSTOP-JSTART+1       !DITTO
C     COMPUTE MARGINS AT TOP AND BOTTOM
      M_VER=256-ISIZE
      M_HOR=256-JSIZE
      M_TOP=M_VER/2
      M_LFT=(256-JSIZE)/2
      IBEGIN=M_TOP+IBIAS
      JBEGIN=M_LFT+JBIAS
      IEND=IBEGIN+ISIZE-1
      JEND=JBEGIN+JSIZE-1
      DO I=IBEGIN,IEND
         II=I-IBEGIN+ISTART
         DO J=JBEGIN,JEND
            JJ=J-JBEGIN+JSTART
            IMAGE(I,J)=BUFFER(II,JJ)
         END DO
```

```
      END DO
C     FILL BORDERS WITH BASEMENT LEVEL, HERE EQUAL TO 32
      IF(IBEGIN.LT.IBIAS+64)IBEGIN=IBIAS+64
      IF(JBEGIN.LT.JBIAS+64)JBEGIN=JBIAS+64
      IF(IEND.GT.IBIAS+191)IEND=IBIAS+191
      IF(JEND.GT.JBIAS+191)JEND=JBIAS+191
      DO I=IBIAS,IBEGIN-1
         DO J=JBIAS,JBIAS+255
            IMAGE(I,J)=32
         END DO
      END DO
      DO I=IBEGIN,IEND
         DO J=JBIAS,JBEGIN-1
            IMAGE(I,J)=32
         END DO
         DO J=JEND+1,JBIAS+255
            IMAGE(I,J)=32
         END DO
      END DO
      DO I=IEND+1,IBIAS+255
         DO J=JBIAS,JBIAS+255
            IMAGE(I,J)=32
         END DO
      END DO
      RETURN
      END

SUBROUTINE MINMAX(ISTART,ISTOP,JSTART,JSTOP,A,MIN,MAX)
C     DETERMINES MINIMUM AND MAXIMUM VALUES IN 2-DIMENSIONAL ARRAY A
      INTEGER*2 A(256,1)
      MIN=A(ISTART,JSTART)
      MAX=MIN
      DO I=ISTART,ISTOP
         DO J=JSTART,JSTOP
            IF(MIN.GT.A(I,J))MIN=A(I,J)
            IF(MAX.LT.A(I,J))MAX=A(I,J)
         END DO
      END DO
      RETURN
      END

SUBROUTINE SCALE(ISTART,ISTOP,JSTART,JSTOP,A,B,MIN,MAX,
     1 BASEMENT,CEILING)
C     SCALES INPUT A TO OUTPUT B SUCH THAT MIN -> BASEMENT AND
C     MAX -> CEILING.  A IS UNALTERED.
      INTEGER*2 A(256,1),B(256,1),BASEMENT,CEILING
      RANGE=MAX-MIN
      SPAN=CEILING-BASEMENT
      DO I=ISTART,ISTOP
         DO J=JSTART,JSTOP
            XB=SPAN*(A(I,J)-MIN)/RANGE+BASEMENT+.49999
            B(I,J)=XB
         END DO
      END DO
      RETURN
      END

SUBROUTINE READGRIN(IMAGE)
C     READS FILE IN GRINNELL FORMAT (512 RECORDS OF 512 BYTES).
C     FILENAME  SPECIFIED INTERACTIVELY RETURNS IMAGE(512,512)
      CHARACTER*128 FILENAME
      INTEGER*2 NAMELENGTH,IERR,LUN,NUMREC,NUMREADIN,NUMWRITTEN
      INTEGER*2 IMAGE(512,512)
      INTEGER*4 RECNUM,STAT,LIB$GET_LUN
      BYTE I_BUF(512)
      COMMON/UIONAME/FILENAME
      COMMON/UIOLEN/NAMELENGTH
      TYPE*,' Enter filename of input file'
      READ(5,1)FILENAME
    1 FORMAT(A128)
      WRITE(6,2)FILENAME
    2 FORMAT(1X,A128)
```

```
C       READ FILE TO BE TESTED
        LUN=56
        CALL UOPENO(LUN,FILENAME,IERR)
        IF (IERR.NE.1)THEN
            TYPE*,'  IERR ON OPENING FOR TEST = ',IERR
            STOP
        END IF
        DO I=1,512
            CALL UREAD(LUN,I,1,I_BUF,NUMREADIN,IERR)
            IF(IERR.NE.1) THEN
                TYPE*,'  IERR @UREAD = ',IERR
                STOP
            END IF
            DO J=1,512
                IF(I_BUF(J).LT.0)THEN
                    IMAGE(I,J)=I_BUF(J)+256
                ELSE
                    IMAGE(I,J)=I_BUF(J)
                END IF
            END DO
        END DO
        CALL UCLOSE(LUN,IERR)
        IF(IERR.NE.1)THEN
            TYPE*,'  IERR @UCLOSE = ',IERR
            STOP
        END IF
        RETURN
        END
```

APPENDIX B

```
C       PROGRAM: EDGEACT (1/16/85) (DERV. FROM SOBEL5 AND TSTRECURS)
C       REVISED 1/29/85 TO CORRECT EDGE ACTIVITY COMPUTATION
C       PREVIOUS VERSION RENAMED APARALLEL FOR ANTI-PARALLEL
C       COMPUTES EDGE ACTIVITY FOR SPECIFIED RANGE OF DATA
C       SOURCE IS AN EDGE MAP DESIGNATED ON READ PROMPT
C       STRIPS ANY AMPLITUDE INFORMATION ON READ
C       NEW DIRECTIONS (DEVELOPED UNDER "SOBEL2" AND "TSTLOGIC")
C       PROCESSES RECTANGLE DEFINED BY (XLL,YLL) AND (XUR,YUR)
C       BIN1: -22.5 TO 22.5
C       BIN2:  22.5 TO 67.5
C       BIN3:  ETC.

CHARACTER*128 IN_FILE,OUT_FILE
        CHARACTER*1 CHAR(128)
        BYTE I_BUF(512),BLANK(512),IXX(512),OUTPUT(0:255)
C       DOUBLE TRANSLATES EDGE DIRECTIONS AND MAGNITUDES SUITABLE
C       FOR DISPLAY WITH "DECODE.TAB"
        INTEGER*2 LOOKUP(-128:127),SPECT(8,512),EACTIVITY
        DATA SPECT/4096*0/
C       LOOKUP TRANSLATES GRINNELL BYTE FORMAT TO VAX INTEGER*2 FORMAT
        INTEGER XLL,YLL,XUR,YUR,TH
        INTEGER DECODE(-128:127),REMAINDER
        DATA IXX/512*0/

ICOMPLETE=0              !USED WHEN COMPUTING HISTOGRAM

C       CONSTRUCT LOOKUP TABLE FOR FORMAT CONVERSION
        DO I=-128,-1
            LOOKUP(I)=I+256
        END DO
        DO I=0,127
            LOOKUP(I)=I
        END DO

C       PREFABRICATE BLACK ROW FOR EFFICIENT MASKING
        DO J=1,512
            BLANK(J)=0
        END DO
        TYPE*,' Specify name of input file - edge map'
        READ(5,60)IN_FILE
60      FORMAT(A128)
```

```
C       OPEN INPUT FILE
        LUN_I=56                                    !INPUT LOGICAL UNIT NUMBER
        OPEN(UNIT=LUN_I,NAME=IN_FILE,STATUS='OLD',
     1  RECORDTYPE='FIXED',FORM='UNFORMATTED')
C       NOTE:RECL=128 (full words)=> 512 BYTES TYPE*,'  Specify name of output file -edge activity'
        READ(5,60)OUT_FILE
C       OPEN OUTPUT FILE
        LUN_O=57                                    !OUTPUT LOGICAL UNIT NUMBER
        OPEN(UNIT=LUN_O,NAME=OUT_FILE,STATUS='NEW',RECL=128,
     1  RECORDTYPE='FIXED',FORM='UNFORMATTED')

TYPE*,'  Specify coordinates in lower-left corner of rectanglar'
        TYPE*,'  region to be processed (Grinnell coordinates)'
        READ(5,*)XLL,YLL
        XUR=511
        YUR=397
        TYPE*,'  Specify coordinates in upper-right corner of rectanglar'
        TYPE*,'  region to be processed (Grinnell coordinates)'
        READ(5,*)XUR,YUR
C       CONVERT TO ARRAY COORDINATES
        JUL=XLL+1
        JLR=XUR+1
        IUL=512-YUR
        ILR=512-YLL IF(IUL.LE.1.OR.ILR.GE.512.OR.JUL.LE.1.OR.JLR.GE.512)STOP
     1  '  Aperture inconsistent with an edge map'

TYPE*,'  Enter a threshold 0 to 15 for input amplitude selection'
        TYPE*,'  Values above threshold are processed'
        READ(5,*)TH
        IF(TH.GT.15.OR.TH.LT.0)STOP '  Invalid TH value'
C       CONSTRUCT TABLE TO DECODE INPUT
        DO LEVEL=0,31
             DECODE(LEVEL)=0
        END DO
        DO LEVEL=32,159
           REMAINDER=JMOD(LEVEL,16)
           NEWLEVEL=LEVEL
           IF(LEVEL.GE.128)NEWLEVEL=LEVEL-256
           IF(REMAINDER.GT.TH)DECODE(NEWLEVEL)=LEVEL/16-1
        END DO
        DO LEVEL=-96,-1
           DECODE(LEVEL)=0
        END DO TYPE*,'  Enter dimension of accum neigh (odd integer)'
        READ(5,*)NAC
        NBY2=NAC/2.
        IF(2*NBY2+1.NE.NAC)STOP '  Faulty NAC'
        IF(NAC.GT.15)STOP '  Dimensioned for max. neighborhood of 15'
C       THE VALUE RETURNED BY "INTEGER FUNCTION EACTIVITY" HAS
C       HAS MAXIMUM = (NAC**2)/2. HOWEVER, IT IS ASSUMED NUMBER OF
C       EDGE ELEMENTS IS REDUCED BY    FRACTION=(16-TH)/16
C       SUCH THAT TRUE MAXIMUM IS MORE LIKE FRACTION*NAC**2/2
C       SCALING IS CHOSEN SUCH THAT THIS MAPS TO 255 BEFORE FORMAT
C       CONVERSION FOR GRINNELL.
        FRACTION=(16.-TH)/16.
        FRACTION=FRACTION*(NAC**2)/2.
        S=255./FRACTION
        LEVEL=0
        DO WHILE(K.LE.255.AND.LEVEL.LE.255)
           K=JNINT(S*LEVEL)
           IF(K.LE.127)THEN
              OUTPUT(LEVEL)=K
           ELSE
              OUTPUT(LEVEL)=K-256
           END IF
           LEVEL=LEVEL+1
        END DO
```

```fortran
C       SKIP ROWS OF IMAGE ABOVE REGION TO BE PROCESSED
        DO LINE=1,IUL-1
            READ(LUN_I,END=100)I_BUF
        END DO
C       WRITE (IUL+NBY2)BLANK LINES
        DO LINE=1,IUL+NBY2
            WRITE(LUN_O)BLANK
        END DO
C       FILL I_BUF WITH ZEROES WHICH SURVIVE IN MARGINS
        DO J=1,512
            I_BUF(J)=0
        END DO JSTART=JUL+1      !1ST COLUMN PROCESSED
        JSTOP=JLR-1       !LAST COLUMN PROCESSED I1=0              !POINTER, WITH I0, IN CIRCULAR BUFFER
        DO LINE=IUL,ILR
            READ(LUN_I)I_BUF
            DO J=JSTART,JSTOP
                IXX(J)=DECODE(I_BUF(J))
            END DO
            CALL ACCUMUL(JSTART,JSTOP,NAC,NBY2,IXX,SPECT)
C           WHEN LINE (IUL+NAC) HAS BEEN PROCESSED, OBTAIN 1ST VALID
C           OUTPUT FOR LINE IUL+1+NBY2.  THAT IS, SPECT LAGS LINE
C           BY NBY2.
            IF(LINE.GE.IUL+NAC)THEN
                DO J=1,JSTART+NBY2-1
                    I_BUF(J)=0
                END DO
                DO J=JSTART+NBY2,JSTOP-NBY2
                    I_BUF(J)=OUTPUT(EACTIVITY(J,SPECT))
                END DO
                DO J=JSTOP-NBY2+1,512
                    I_BUF(J)=0
                END DO
                WRITE(LUN_O)I_BUF
            END IF
        END DO C       WRITE (513-ILR+NBY2) BLANK LINES
        DO LINE=1,512-ILR+NBY2
            WRITE(LUN_O)BLANK
        END DO
        STOP '  SUCCESSFUL COMPLETION'
C   2   STOP '   ERROR ON OPENING INPUT FILE'
C   3   STOP '   ERROR ON OPENING OUTPUT FILE'
C   4   STOP '   ERROR ON READING INPUT FILE'
C   5   STOP '   ERROR ON WRITING OUTPUT FILE'
    6   STOP '  ERROR ON CLOSING INPUT FILE'
    7   STOP '  ERROR ON CLOSING OUTPUT FILE'
   66   STOP '  ERROR ON REWINDING INPUT FILE'
  100   STOP '   END OF INPUT FILE PREMATURELY ENCOUNTERED'
        END SUBROUTINE ACCUMUL(J1,J2,NAC,NBY2,IXX,SPECT)
        INTEGER NEWDIR,OLDDIR,POINTER,Q(512)
        INTEGER*2 SPECT(8,512)
        BYTE IXX(1),HOR(8),VER(8,512,0:15)
        DATA POINTER/0/,VER/65536*0/
        DO K=1,8
            HOR(K)=0
        END DO C       RANGE OF VALID ACCUMULATION IS J=J1+NBY2,J2-NBY2
        DO J=J1-NBY2,J2-NBY2
C           RECURSIVELY COMPUTE HORIZONTAL ACCUMULATION AT COLUMN J
            NEWDIR=IXX(J+NBY2)
```

```
        IF(NEWDIR.GT.0)HOR(NEWDIR)=HOR(NEWDIR)+1
        IF(J-NBY2-1.GE.J1)THEN
            OLDDIR=IXX(J-NBY2-1)
            IF(OLDDIR.GT.0)HOR(OLDDIR)=HOR(OLDDIR)-1
        END IF
C       RECURSIVELY COMPUTE EDGE SPECTRUM AT COLUMN J
        IF(J.GE.J1+NBY2)THEN
            DO K=1,8
                SPECT(K,J)=SPECT(K,J)-VER(K,J,POINTER)
                SPECT(K,J)=SPECT(K,J)+HOR(K)
                VER(K,J,POINTER)=HOR(K)
            END DO
        END IF
    END DO
    POINTER=JMOD(POINTER+1,NAC)
    RETURN
    END

INTEGER FUNCTION EACTIVITY(J,SPECT)
    INTEGER*2 SPECT(8,512),A,ACOMPL,B,BCOMPL
    A=SPECT(1,J)+SPECT(5,J)
    ACOMPL=SPECT(3,J)+SPECT(7,J)
    B=SPECT(2,J)+SPECT(6,J)
    BCOMPL=SPECT(4,J)+SPECT(8,J)
    EACTIVITY=IMIN0(A,ACOMPL)+IMIN0(B,BCOMPL)
    RETURN
    END
```

What is claimed is:

1. An apparatus for the automatic recognition of images wherein characteristics of at least one prototype edge spectrum are compared with like characteristics at least partly derived from at least one input edge spectrum, the apparatus comprising;

means for retrieving an image;

means for deriving an edge map from said image, the edge map comprising an array of edge elements each having a direction;

means for computing an input edge spectrum at a selected point on said edge map from a surrounding neighborhood of edge elements, said edge spectrum being divided into a plurality of spectrum components, each component representing the number of edge elements within said neighborhood having a direction within a specific angular range;

a feature detector means for detecting mutally orthogonal edges present in said neighborhood and for correlating characteristics of an image prototype and an input spectrum;

wherein for a set of first angularly adjacent spectrum components, said feature detector means adds to each first component a second component roughly colinear to said first component, to obtain a plurality of first sums, wherein said feature detector means adds to a third component of said spectrum roughly orthogonal to said first component a fourth component of said spectrum roughly colinear to said third component, to obtain a plurlaity of second sums, wherein said feature detector means multiplies said first sums by said second sums to obtain a plurality of products, and wherein said feature detector means sums the products to obtain an orthogonal edge activity magnitude, said magnitude being used to determine the relative number of mutually orthogonal edges in said neighborhood; and means for generating an indication of recognition of said image in response to the result from said feature detector means.

2. An apparatus for the automatic recognition of images wherein characteristics of at least one prototype edge spectrum are compared with like characteristics at least partly derived from at least one input edge spectrum, the apparatus comprising;

means for retrieving an image;

means for deriving an edge map from said image, the edge map comprising an array of edge elements each having a direction;

means for computing an input edge spectrum at a selected point on said edge map from a surrounding neighborhood of edge elements, said edge spectrum being divided into a plurality of spectrum components, each component representing the number of edge elements within said neighborhood having a direction within a specific angular range;

a feature detector means for detecting mutually orthogonal edges present in said neighborhood and for correlating characteristics of an input spectrum and an image prototype;

wherein said feature detector means multiplies the magnitude of each component of said spectrum by a magnitude of a second, roughly orthogonal angular component to obtain a plurality of products equal to the number of said components in said spectrum, and wherein the feature detector means sums said products to obtain an orthogonal edge activity magnitude for said neighborhood, said magnitude thereafter being used to determine whether said neighborhood contains a relatively large number of mutually orthogonal edges; and means for generating an indication of recognition of said image in response to output from said detector.

3. An apparatus for the automatic recognition of images wherein characteristics of at least one prototype edge spectrum are compared with like characteristics at least partly derived from at least one input edge spectrum, the apparatus comprising:

means for retrieving an image;

means for deriving an edge map from said image, the edge map comprising an array of edge elements each having a direction;

means for computing an input edge spectrum at a selected point on said edge map from a surrounding neighborhood of edge elements, said edge spectrum being divided into a plurality of spectrum components, each component representing the number of edge elements within said neighborhood having a direction within a specific angular range;

a feature detector means for detecting edge directional reverals within said neighborhood, wherein said feature detector means finds a gap, said gap being comprised of a plurality of angularly adjacent components of said input spectrum each having a relatively low magnitude as compared to other components of said input spectrum angularly bounding said gap. wherein said feature detector means finds an edge reversal feature direction as a function of the average direction of said gap as rotated by 90°;, wherein said feature detector means calculates a size discriminant, the size discriminatn being a function of the total magnitude of said input spectrum and the number of pixels in said neighborhood, wherein said feature detector means calculates a symmetry discriminant, the symmetry discriminant being related to the difference in magnitude of said bounding components and wherein said feature detector means derives an edge reversal feature magnitude as a function of the size discriminant and the symmetry discriminant, the edge reversal feature magnitude and edge reversal direction being used to determine the existence and direction of an edge reversal feature within said neighborhood; and means for generating an indication of recognition of said image.

4. The apparatus of claim 3, wherein:

said gap components have magnitudes near zero, the detector calculating subcomponents of said bounding components which are parallel to said edge reversal feature direction, said detector summing said subcomponents of those bounding components closer to one side of said gap into a first symmetry discriminant operand, said detector summing said subcomponents of the bounding components closer to a second side of said gap into a second symmetry discriminant operand;

said first and second symmetry discriminant operands thereafter being used to calculate said symmetry discriminant.

5. The apparatus of claim 3, wherein:

said edge directional reversal detector further includes a preliminary binary indicator;

said binary indicator comprising a number of addressed entries representable by n bits, where n is the number of angular bins, each angular bin corresponding to the angular range of edge directions represented by a spectrum component;

said spectrum being quantized into a binary address of n bits, each of said gap components of said input spectrum having a relatively low magnitude being represented by a first binary bit value, each of said components of said spectrum having a relatively high magnitude being represented by a second binary bit value, angularly adjacent components of said spectrum being represented by adjacent bits in the address;

each of said addressed entries having either a first or a second return bit, a first return bit being preassigned to an addressed entry only upon the corresponding type of spectrum having certain characteristics, said characteristics including only one plurality of adjacent spectrum components having a relatively low magnitude with respect to angularly bounding spectrum components, a second return bit being preassigned to an addressed entry where the corresponding quantized spectrum does not possess said characteristics;

said edge directional reversal feature detector not computing said edge reversal feature direction and computing said edge feature magnitude as zero if the binar indicator returns said second return bit.

6. The apparatus of claim 5, wherein:

said characteristics of said quantized spectrum necessary for said binary indicator to return said first return bit include:

only one instance of an integral number of adjacent gap components, said number ranging from $(3n/8)$ to $(n/2)$;

at least $(3n/8)$ and no more than $(5n/8)$ spectrum components having a nonzero magnitude; and if said quantized spectrum has a number of nonzero spectrum components equal to $(3n/8)$, the nonzero spectrum components occur in adjacent angular bins.

7. In an apparatus for the automatic recognition of images wherein edge maps are analyzed for the occurrence of orthogonal edge features, the improvement comprising:

means for storing an edge contained within a neighborhood of image pixels as an edge vector having magnitude and direction;

means for accumulating edge vectors into an edge spectrum for said neighborhood, said spectrum having a plurality of components equal to a number of angular bins, each bin being of equal angular width;

a feature detector means for detecting mutually orthogonal edges present within said neighborhood wherein said feature detector means, for a set of angularly adjacent first components, adds the magnitude of a roughly colinear second component to the magnitude of each of said first components to obtain a set of first sums wherein said feature detector means, for each of said first set of components, adds the magnitude of a thurd component orthogonal to one of said first components to the magnitude of a fourth component also orthogonal to said first component, to obtain a set of second sums and wherein said feature detector means calculates the minimum of each of said first sums and a corresponding second sum to obtain a set of orthogonal pair values, the feature detector means summing the orthogonal pair values to obtain an orthogonal edge activity feature magnitude for said neighborhood; and means for using said orthogonal edge activity feature magnitude to determine the relative number of mutually orthogonal edges present in said neighborhood.

8. In an apparatus for the automatic recognition of images wherein edge maps are analyzed for the occurrence of edge reversal features, the improvement comprising:

means for storing a number of edges contained within a neighborhood of image pixels as corresponding edge vectors having magnitude and direction;

means for accumulating a plurality of said edge vectors into an input edge spectrum for said neighborhood, said spectrum being divided into a plurality of components equal to a number of angular bins, each bin being of equal angular width;

a feature detector means for detecting edge directional reversals within said neighborhood for finding a gap, said gap being a plurality of angularly adjacent components of said spectrum, said adjacent components having a relatively low magnitude with respect to other components of said spectrum angularly bounding said gap;

wherein said feature detector means finds a direction of an adge reversal feature as a function of the average of the angular bin number of each component in said gap as rotated by a number of bins equivalent to 90°;

wherein said feature detector means calculates size discriminant as a function of the total magnitude of said spectrum and the number of pixels within the image area represented by said neighborhood, said function reaching its greatest value when said spectrum magnitude equals a predetermined fraction of said area pixel number;

wherein said feature detector means calculates a symmetry discriminant as a function of the difference of the magnitudes of said bounding components; and wherein said feature detector means derives a nonzero edge reversal feature magnitude as a fuction of the size descriminant and the symmetry discriminant; and means for using the edge reversal feature magnitude and direction to determine the existence and direction of an edge reversal within said neighborhood.

9. The apparatus of claim 8, wherein:

said feature detector means, after determining said direction of said edge reversal feature, determines the subcomponents of said bounding components which are parallel to said direction;

wherein said feature detector means sums said subcomponents of those bounding components closer to a first side of said gap into a first symmetry discriminant operand and sums the bounding components closer to a second side of said gap into a second symmetry discriminat operand;

wherein said symmetry discriminant is calculated as a function of the minimum of sayd symmetry discriminant operands divided by the maximum of said symmetry discriminant operands.

10. The apparatus of claim 8, wherein said feature detector means includes a preliminary binary indicator, said binary indicator comprising a number of addressed entries representable by n binary bits, where n is the number of said angular bins;

said input spectrum being quantized into a binary address of n bits, each of said spectrum components having a relatively low magnitude being represented by a first binary bit value, each of said spectrum components having a relatively high magnitude being represented by a second binary bit value, angularly adjacent components being represented by adjacent bits in the address, each of said addressed entries having either a first or a second return bit, a first return bit being preassingned to an addressed entry only upon a corresponding type of spectrum having certain characteristics, said characteristics including only one gap formed from three or more adjacent spectrum components, a second return bit being preassigned to an addressed entry where the corresponding type of spectrum does not possess said characteristics;

wherein said feature detector means does not compute said edge reversal feature direction, and computes said edge feature magnitude as zero if the binary indicator returns said second return bit.

11. An apparatus for the detection of opposite ends of an at least roughly symmetrical object contained within an image, comprising:

means for detecting and storing edge elements contained within a neighborhood of image pixels in said image, each said edge element being represented by an edge vector having magnitude and direction, said edge-storing means storing edge vectors for a plurality of neighborhoods within said image as an edge map;

means for accumulating said edge vectors for each neighborhood into an edge spectrum, each said spectrum being divided into a plurality of components equal to a number of angular bins, said bins being of equal angular width, each said component representing edge vectors having directions falling into said component's angular bin;

a detector for processing the edge spectrum for each neighborhood to find an edge directional reversal feature therewithin;

means in said detector, for testing for a gap in each spectrum, said gap comprising a plurality of angularly adjacent components having relatively low magnitudes with respect to the components angularly bounding said gap;

means in said detector for testing said spectrum for certain other characteristics, deriving a direction for an edge reversal feature as a function of the average of the angular bin numbers of said gap components, as rotated by a number of bins equivalent to 90°;

means in said detector for calculating a size discriminant for each edge reversal feature as a function of the total magnitude of said edge spectrum and the number of pixels in the corresponding neighborhood, and a symmetry discriminant related to the difference between the magnitudes of components bounding said gap;

said detector deriving an edge reversal feature magnitude as a function of said size discriminant and said symmetry discriminant;

said detector assigning a location to said edge reversal feature corresponding to the central pixel of the image neighborhood from which said edge reversal feature is derived;

said apparatus further comprising means for purging all edge reversal features having submaximal magnitudes within a predetermined area of said edge map to leave one maximum edge reversal feature per area, said means purging a plurality of said areas comprising said edge map;

means for choosing a first maximum edge reversal feature and searching for a second maximum edge reversal feature having an opposite direction, said first maximum edge reversal feature being purged if a corresponding second maximum edge reversal feature is not found, said last means testing each maximum edge reversal feature in like manner until only pairs of maximum edge reversal features of opposite directions remain; and means for choosing one of said pairs of said maximal edge reversal features as the ends of said object.

12. The apparatus of claim 11, wherein:

said edge reversal feature detector includes a preliminary binary indicator comprising a number of addressed entries representable by n bits, where n is the number of angular bins in an edge spectrum;

said feature detector quantizing said spectrum into a binary address of n bits, each of said spectrum components having a relatively low magnitude being represented by a first binary bit value, each of said spectrum components having a relatively high magnitude being represented by a second binary bit Value, angularly adjacent spectrum components being represented by adjacent bits in the address, each of said addressed entries having either a first or a second return bit, a first return bit being preassigned to an addressed entry only upon the corresponding quantized spectrum having certain characteristics, said characteristics including only one instance of a gap comprising an integral number of adjacent spectrum components, said number ranging from (3n/8) to (n/2) of said input spectrum;

at least (3n/8) and no more than (5n/8) spectrum components leaving a nonzero magnitude; and if said quantized spectrum has an integral number of nonzero spectrum components equal to (3n/8), the nonzero spectrum components occurring in adjacent angular bins;

a second return bit being preassigned to an addressed entry where the corresponding quantized spectrum does not possess said characteristics;

said edge directional reversal detector not computing said edge reversal feature direction and computing said edge feature magnitude as zero if the binary indicator returns said second return bit.

13. The apparatus of claim 11, wherein:

said means for choosing one of said pairs of said maximal edge reversal features as the ends of said object includes:

means for measuring the distance between the members of each pair;

means for comparing said distance to a predetermined distance value range; and means for selecting one of said pairs as the ends of said object, the pair having a distance within said predetermined distance range.

14. The apparatus of claim 13, wherein said distance range is derived from a stored absolute distance range and the range of said object as found by a range finder.

15. In a method for the automatic recognition of images wherein characteristics derived from at least one prototype image are compared to like characteristics of at least one input spectrum constructed from an input image, the steps of;

storing selected characteristics of said prototype image;

retrieving an input image;

converting said input image into an edge map, the edge map comprising a plurality of edge vectors each having an edge magnitude and an edge direction;

computing an input edge spectrum at a selected point on said edge map from a surrounding neighborhood of edge vectors, said edge spectrum comprising a plurality of components each representing a number of edge vectors within said neighborhood, said edge vectors having directions falling within a specified angular range corresponding to one of said components;

shifting an edge spectrum of said prototype by an angular lag;

comparing said shifted prototype spectrum to said input spectrum;

for each shift, calculating a correlation factor equal to the vector inner product of said shifted prototype spectrum and said input spectrum minus the norm of the difference of the squares of said shifted prototype spectrum and said input spectrum; and repeating the steps if shifting said prototype spectrum and calculating said correlation factor for a number of different consecutive angular lags equal to the number of components in said input spectrum and selecting the largest of said correlation factors to produce a correlation magnitude between the compared edge spectra thereby detecting a structural feature of said image within said neighborhood; and generating an indication of recognition of said image in response to said detection of said structural feature.

16. In a method for the automatic recognition of images wherein characteristics derived from at least one prototype image are compared to like characteristics of at least one input spectrum constructed from an input image, the steps of;

storing selected characteristics of said prototype image;

retrieving an input image;

converting said input image into an edge map, the edge map comprising a plurality of edge vectors each having an edge magnitude and an edge direction;

computing an input edge spectrum at a selected point on said edge map from a surrounding neighborhood of edge vectors, said edge spectrum comprising a plurality of components each representing a number of edge vectors within said neighborhood, said edge vectors having directions falling within a specified angular range corresponding to one of said components;

for a set of first, adjacent components comprising a first portion of said input spectrum, adding the magnitude of a roughly colinear second component to the magnitude of a first component, to obtain a plurality of first sums;

for each first componenet, adding the magnitude of a roughly orthogonal third component of said input spectrum to the magnitude of a fourth component also roughly orthogonal to said first component, to obtain a set of second sums;

thereafter taking the minimum of each of said first sums and a corresponding second sum to obtain a plurality of orthogonal edge pair values;

summing the edge pair values to obtain an orthogonal edge activity magnitude;

using said orthogonal edge activity magnitude to ascertain if said neighborhood has a relatively large number of mutually orthogonal edges, thereby detecting structural feature of said image within said neighborhood; and generating an indication of recognition of said image in resonse to said detection of said structural feature.

17. In a method for the automatic recognition of images wherein characteristics derived from at least one prototype image are compared to like characteristics of at least one input spectrum constructed from an input image, the steps of:

storing selected characteristics of said prototype image;

retrieving an input image;

converting said input image into an edge map, the edge map comprising a plurality of edge vectors each having an edge magnitude and an edge direction;

suppressing those of said edge vectors having magnitudes below a selected threshold wherein the threshold is chosen so as to reject a constant percentage of said vectors for any edge map, thereby making said input spectrum independent of those changes of contrast with are uniform across said image;

computing an input edge spectrum at a selected point on said edge map from a surrounding neighborhood of edge vectors, not including the suppressed edge vectors, said edge spectrum comprising a plurality of components each representing a number of edge vectors within said neighborhood, said edge vectors having directions falling within a specified angular range corresponding to one of said components;

finding a gap composed of a plurality of angularly adjacent components of said input spectrum, each of said gap components having relatively low magnitudes as compared to other components angularly bounding said gap;

testing said input spectrum for the existence of other characteristics based on the magnitude and angular location of said spectrum components;

if said input spectrum passes said test, deriving an edge reversal feature direction as a function of an average of the direction of said gap as rotated by 90°;

for each edge reversal feature direction, calculating an edge reversal feature magnitude as a function of a size discriminant and a symmetry discriminant, said size discriminant being a function of the total magnitude of said spectrum and the number of image pixels represented by said neighborhood, the symmetry discriminant being calculated as a function of the difference of the magnitudes of said bounding components;

using the edge reversal feature magnitude and the edge reversal feature direction to determine the existence and direction of an edge reversal within said neighborhood; and generating an indication of recognition of said image in response to the determination of the edge reversal.

18. The method of claim 17, wherein said gap components have magnitudes near zero, said step of calculating an edge reversal feature magnitude further including the steps of:

calculating subcomponents of said bounding components which are parallel to said edge reversal feature direction;

summing said subcomponents of those bounding components closer to one side of said gap into a first symmetry discriminant operand;

summing said subcomponents of the components closer to a second side of said gap into a second symmetry discriminant operand; and using said first and second symmetry discriminant operands to calculate said symmetry discriminant.

19. The method of claim 17, wherein the steps of testing said input spectrum for the existence of other characteristics includes the steps of:

forming a preliminary binary indicator having a number of addressed entries representable by the number of bits equal to the number of angular bins, each angular bin corresponding to a spectrum component and to a range of edge vector angles, each bin being of equal angular width;

preassigning a first return bit to an addressed entry only upon the corresponding type of spectrum having certain characteristics, including only one gap of three or more adjacent spectrum components;

preassigning a second return bit to an addressed entry where the corresponding type of spectrum does not possess said characteristics;

quantizing said edge spectrum into a binary address of n bits in being the number of angular bins, said address being formed by representing each of said components of said spectrum having a relatively low magnitude by a first binary bit value, representing each of said components of said spectrum having a relatively high magnitude by a second binary bit value and representing angularly adjacent components of said spectrum by adjacent bits in said address;

returning said first return bit or said second return bit upon accessing said binary address of said binary indicator corresponding to said quantized spectrum address; and not computing said edge reversal feature direction and computing said edge reversal feature magnitude as zero if said binary indicator returns said second return bit.

20. The method of claim 19 wherein said step of forming said binary indicator includes the steps of:

preassigning said second return bit if said corresponding addressed spectrum type has more than one gap composed of three or more adjacent spectrum components;

preassigning said second return bit to an address where said corresponding spectrum type has a gap comprising a number of adjacent spectrum components outside the range of (3n/8) to (n/2);

preassigning said second return bit to an indicator address if said corresponding spectrum type does not have a range of nonzero spectrum components from (3n/8) to (5n/8); and preassigning said second bit to an indicator address if the corresponding spectrum type has a number of nonzero spectrum components equal to (3n/8), but said nonzero spectrum components are not adjacent.

21. The method of claim 17, further including the steps of:

finding all edge reversal features within said edge map by moving said neighborhood to successive locations on said edge map;

purging all edge reversal features having submaximal magnitudes within each of several predetermined areas of said edge map to leave one maximum edge reversal feature per area;

choosing a first maximum edge reversal feature;

searching for a second maximum edge reversal feature having a direction opposite to said first maximum edge reversal feature;

if no said second maximum edge reversal feature is found, purging said first maximum edge reversal feature;

repeating the above said choosing, searching and purging steps until only pairs of maximum edge reversal features remain; and choosing one of said pairs as the ends of an object depicted in said image.

22. The method of claim 21, wherein the step of choosing one of said pairs as the ends of said object further includes the steps of:

measuring the distance between the members of each of said pairs;

comparing said distance to a predetermined distance range; and rejecting as said object ends any pair having a distance outside of said predetermined distance range.

23. The method of claim 22, further including the step of deriving said predetermined distance range from a stored absolute distance range and the range of said object as found by a range finder.

24. The method of claim 23, further including the steps of:

deriving the roll of said object with respect to the horizontal from the amount of angular shift of an edge spectrum for a portion of said object;

calculating the required edge feature directions of said ends from said roll; and purging all edge reversal features not having one of said required edge reversal feature directions.

* * * * *